United States Patent
Shakkarwar

(10) Patent No.: US 10,740,843 B2
(45) Date of Patent: *Aug. 11, 2020

(54) SYSTEMS AND METHODS FOR CONTROLLING PAYMENT PROCESSING

(71) Applicant: VERIENT INC., San Jose, CA (US)

(72) Inventor: Rajesh G. Shakkarwar, Mountain View, CA (US)

(73) Assignee: VERIENT, INC., San Jose, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 15/681,298

(22) Filed: Aug. 18, 2017

(65) Prior Publication Data

US 2017/0372428 A1    Dec. 28, 2017

Related U.S. Application Data

(63) Continuation of application No. 13/011,501, filed on Jan. 21, 2011, now Pat. No. 9,741,077.

(60) Provisional application No. 61/297,627, filed on Jan. 22, 2010.

(51) Int. Cl.
  *G06Q 40/06*  (2012.01)
  *G06Q 20/10*  (2012.01)
  *G06Q 40/00*  (2012.01)

(52) U.S. Cl.
  CPC ............ *G06Q 40/06* (2013.01); *G06Q 20/10* (2013.01); *G06Q 20/102* (2013.01); *G06Q 40/00* (2013.01)

(58) Field of Classification Search
  CPC ........ G06Q 10/00; G06Q 20/00; G06Q 30/00; G06Q 40/00

USPC ....................................................... 705/3–44
See application file for complete search history.

(56) References Cited

U.S. PATENT DOCUMENTS

| | | | |
|---|---|---|---|
| 5,884,271 A | 3/1999 | Pitroda | |
| 5,953,710 A | 9/1999 | Fleming | |
| 7,104,440 B2 | 9/2006 | Hansen et al. | |
| 7,284,126 B2 | 10/2007 | Engel | |
| 7,546,945 B1 * | 6/2009 | Bucci ................... | G06Q 20/10 235/379 |
| 7,665,657 B2 | 2/2010 | Huh | |
| 7,769,688 B1 | 8/2010 | Bent et al. | |
| 7,904,385 B2 | 3/2011 | Bishop et al. | |
| 7,941,367 B2 | 5/2011 | Bishop et al. | |

(Continued)

FOREIGN PATENT DOCUMENTS

| | | |
|---|---|---|
| EP | 1383079 A2 | 11/2009 |
| EP | 2355033 A1 | 8/2011 |
| WO | 2009/137716 A2 | 11/2009 |

OTHER PUBLICATIONS

Levitin, Adam, "Payment Wars: The Merchant-Bank Struggle for Control of Payment Systems", Stanford Journal of Law, Business & Finance; 12, 2; ProQuest Central p. 425. Spring (Year: 2007).*

(Continued)

*Primary Examiner* — Frantzy Poinvil
(74) *Attorney, Agent, or Firm* — Artegis Law Group, LLP

(57) ABSTRACT

A computer-implemented method for generating a financial product that is configured to be used for one or more payment transactions. The method includes receiving a selection of a plurality of core accounts for providing financial backing for the financial product, and generating the financial product based on one or more control parameters that define use restrictions for the financial product.

18 Claims, 12 Drawing Sheets

(56) References Cited

U.S. PATENT DOCUMENTS

| | | | |
|---|---|---|---|
| 7,941,372 B2* | 5/2011 | Bishop | G06Q 20/10 705/39 |
| 7,962,408 B2 | 6/2011 | Bishop et al. | |
| 8,020,763 B1* | 9/2011 | Kowalchyk | G06Q 20/102 235/380 |
| 8,032,456 B1* | 10/2011 | Bent | G06Q 20/102 235/379 |
| 8,121,941 B2* | 2/2012 | Matthews | G06Q 10/04 705/39 |
| 8,260,705 B1 | 9/2012 | Bent et al. | |
| 8,311,939 B1 | 11/2012 | Bent et al. | |
| 8,606,702 B2* | 12/2013 | Ruckart | G06Q 20/12 235/380 |
| 8,676,708 B1 | 3/2014 | Honey | |
| 8,688,577 B1* | 4/2014 | Bent | G06Q 40/06 235/385 |
| 8,689,012 B1 | 4/2014 | Bierbaum et al. | |
| 8,751,376 B1 | 6/2014 | Wilkes | |
| 8,781,931 B1 | 7/2014 | Bent et al. | |
| 8,793,164 B2 | 7/2014 | Sendo et al. | |
| 8,881,975 B1* | 11/2014 | Matthews | G06Q 10/02 235/379 |
| 9,424,603 B2* | 8/2016 | Hammad | G06Q 30/0639 |
| 2001/0001856 A1 | 5/2001 | Gould et al. | |
| 2002/0111886 A1 | 8/2002 | Chenevich et al. | |
| 2003/0191711 A1 | 10/2003 | Jamison et al. | |
| 2004/0158522 A1 | 8/2004 | Brown et al. | |
| 2005/0033609 A1 | 2/2005 | Yang | |
| 2005/0132202 A1 | 6/2005 | Dillaway et al. | |
| 2005/0216354 A1 | 9/2005 | Bam et al. | |
| 2005/0256747 A1* | 11/2005 | Hellrigel | G06Q 20/02 705/4 |
| 2006/0064320 A1 | 3/2006 | Postrel | |
| 2006/0076400 A1 | 4/2006 | Fletcher | |
| 2006/0165060 A1 | 7/2006 | Dua | |
| 2006/0229959 A1 | 10/2006 | Heidingsfeld et al. | |
| 2007/0255653 A1* | 11/2007 | Tumminaro | G06Q 20/10 705/39 |
| 2007/0282739 A1 | 12/2007 | Thomsen | |
| 2009/0070260 A1 | 3/2009 | Flitcroft et al. | |
| 2009/0150288 A1 | 6/2009 | Bishop et al. | |
| 2009/0281944 A1 | 11/2009 | Shakkarwar | |
| 2010/0063906 A1 | 3/2010 | Nelsen et al. | |
| 2010/0153224 A1 | 6/2010 | Livnat | |
| 2010/0211445 A1 | 8/2010 | Bodington | |
| 2010/0280956 A1* | 11/2010 | Chutorash | G06Q 20/20 705/64 |
| 2011/0106674 A1 | 5/2011 | Perlman | |
| 2011/0106696 A1 | 5/2011 | Seven | |
| 2012/0066096 A1* | 3/2012 | Penide | G06Q 20/12 705/27.1 |
| 2012/0253852 A1* | 10/2012 | Pourfallah | G06Q 20/3276 705/4 |
| 2013/0080323 A1 | 3/2013 | Scipioni | |
| 2013/0103560 A1 | 4/2013 | Stone et al. | |
| 2013/0275305 A1* | 10/2013 | Duplan | G06Q 20/322 705/44 |
| 2013/0346305 A1 | 12/2013 | Mendes | |
| 2014/0278989 A1* | 9/2014 | Calman | G06Q 30/0215 705/14.55 |
| 2014/0279008 A1* | 9/2014 | Calman | G06Q 30/0215 705/14.58 |
| 2014/0324627 A1* | 10/2014 | Haver | G06O 30/0639 705/26.9 |
| 2015/0058109 A1* | 2/2015 | Lange | G06Q 30/0224 705/14.25 |
| 2015/0278811 A1* | 10/2015 | Lalchandani | G06Q 20/40 705/42 |
| 2017/0069028 A1* | 3/2017 | Narayana | G06Q 40/06 |

OTHER PUBLICATIONS

Pollock, J., "Conditional Verbs," English Grammar and Teaching Strategies: Lifeline to Literacy, 1999, p. 42.

"SAP Business One Glossary," SAP Business One 8.8, Jun. 2009, pp. 138.

"How to Manage Budgets," SAP Business One How-To Guide, SAP Business One 8.8, Dec. 2009, pp. 27.

Real, L., "SAP Business One in Action—The Difference Between Consolidation Options (Payment & Delivery) in the Business Partner Master Data," SAP Community Network, Dec. 2009, pp. 17.

"Finextra: Pay Pal launches teen account that lets parents track kids' spending," retrieved from http://www.finextra.com/news/fullstory.aspx?newsitemid=20370, retrieved on Nov. 27, 2013, pp. 3.

European Search Report, EP App. No. EP 11 15 1777, dated May 25, 2011, 4 pages.

Non-Final Rejection received for U.S. Appl. No. 13/011,501, dated Feb. 27, 2012, 15 pages.

Final Rejection received for U.S. Appl. No. 13/011,501, dated Jul. 12, 2012, 13 pages.

Non-Final Rejection received for U.S. Appl. No. 13/011,501, dated Jan. 31, 2014, 12 pages.

Final Rejection received for U.S. Appl. No. 13/011,501, dated Sep. 9, 2014, 14 pages.

Non-Final Rejection received for U.S. Appl. No. 13/011,501, dated Jan. 15, 2015, 9 pages.

Final Rejection received for U.S. Appl. No. 13/011,501, dated Jul. 1, 2015, 15 pages.

Non-Final Rejection received for U.S. Appl. No. 13/011,501, dated Jan. 29, 2016, 29 pages.

Notice of Allowance received for U.S. Appl. No. 13/011,501, dated Aug. 5, 2016, 8 pages.

Non-Final Office Action for U.S. Appl. No. 13/011,525, dated Dec. 5, 2013, 68 pages.

Non-Final Office Action for U.S. Appl. No. 13/011,525, dated Nov. 13, 2014, 41 pages.

Non-Final Office Action for U.S. Appl. No. 13/011,525, dated Jul. 13, 2015, 18 pages.

Final Office Action for U.S. Appl. No. 13/011,525, dated Oct. 22, 2015, 20 pages.

Notice of Allowance received for U.S. Appl. No. 13/011,501, dated Apr. 19, 2017, 23 pages.

Non-Final Rejection received for U.S. Appl. No. 13/011,525, dated Apr. 18, 2012, 29 pages.

European Examination Report, EP App. No. EP 11 15 1777, dated Apr. 24, 2012, 7 pages.

Final Rejection received for U.S. Appl. No. 13/011,525, dated Sep. 7, 2012, 47 pages.

Non-Final Rejection received for U.S. Appl. No. 13/011,525, dated Feb. 28, 2017, 19 pages.

Final Rejection received for U.S. Appl. No. 13/011,525, dated Jun. 14, 2017, 10 pages.

Non-Final Rejection received for U.S. Appl. No. 13/011,525, dated Apr. 5, 2018, 20 pages.

Final Rejection received for U.S. Appl. No. 13/011,525, dated Aug. 28, 2018, 25 pages.

Non-Final Rejection received for U.S. Appl. No. 13/011,525, dated Dec. 17, 2018, 24 pages.

Final Rejection received for U.S. Appl. No. 13/011,525, dated Apr. 8, 2019, 18 pages.

Notice of Allowance received for U.S. Appl. No. 13/011,525, dated Dec. 6, 2019, 26 pages.

* cited by examiner

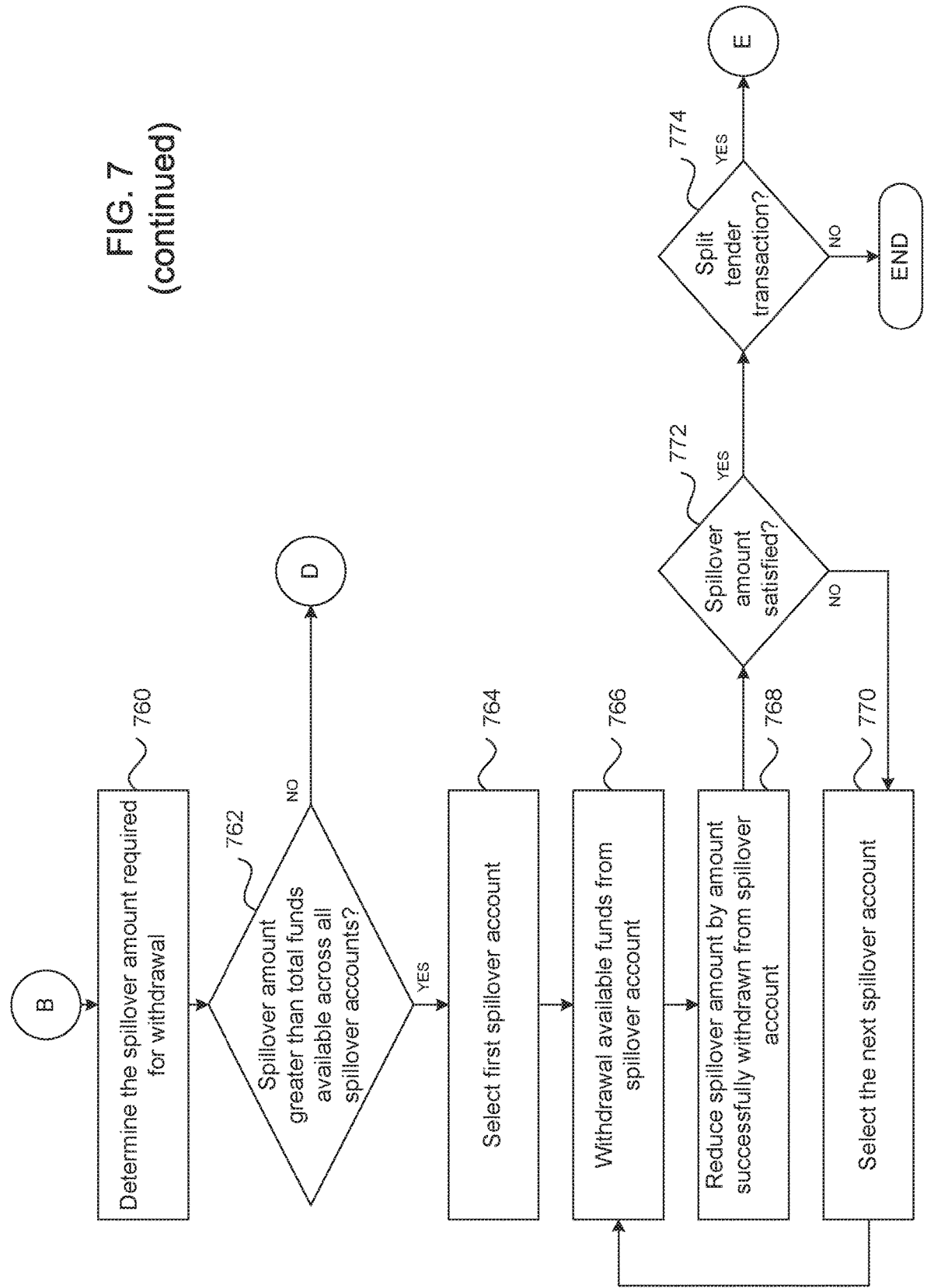

SYSTEMS AND METHODS FOR CONTROLLING PAYMENT PROCESSING

CROSS-REFERENCE TO RELATED APPLICATIONS

This application is a continuation of the U.S. patent application titled, "SYSTEMS AND METHODS FOR CONTROLLING PAYMENT PROCESSING," filed on Jan. 21, 2011 and having Ser. No. 13/011,501 now U.S. Pat. No. 9,741,077, which claims priority benefit of the United States Provisional Patent Application titled, "SYSTEMS AND METHODS FOR CONTROLLING PAYMENT PROCESSING," filed on Jan. 22, 2010 and having Application No. 61/297,627. The subject matter of these related applications is hereby incorporated herein by reference.

BACKGROUND

Field of the Invention

The present invention relates generally to the field of payment processing and, more particularly, to systems and methods for controlling payment processing.

Description of the Related Art

As is known, several methods of payment for goods or services exist today, including cash, check, credit card, and debit card. Some of the most popular methods of payment include payment by credit card and by debit card. When credit/debit cards were first introduced, there was no concept of online payments, online banking, or payments via mobile phone. Today, these forms of payment are also very common.

A credit/debit card system is one where an issuer, usually a financial institution, issues a credit/debit card to a customer. The customer may then pay for goods or services using the credit/debit card. Essentially, the issuer is lending money to the customer to pay for the good or services.

When payment for goods or services is initiated with a credit/debit card, the transaction details are sent to a card network for processing. Each credit/debit card has a unique prefix that allows for proper routing of the transaction to the proper card network and to the proper financial institution. When the transaction is received by the financial institution, the transaction is processed and either approved or denied based on well-defined criteria.

However, existing payment products, including credit/debit cards, are premised on legacy systems that are difficult to change. For example, many financial institution systems use older generation software and mainframe computers. The rigidity of this legacy infrastructure, along with the large amount of information technology resources spent on compliance and maintenance, do not allow financial institutions to keep pace with payment technology advancements and customer demands.

Accordingly, there exists a need in the art for a payment processing platform that allows financial institutions to offer more sophisticated payment processing approaches with minimal changes to their legacy systems.

SUMMARY

A computer-implemented method for generating a financial product that is configured to be used for one or more payment transactions. The method includes receiving a selection of a plurality of core accounts for providing financial backing for the financial product, generating the financial product based on one or more control parameters that define use restrictions for the financial product, and causing the financial product to be distributed to a recipient. The method further includes modifying the control parameters via email, web, text or SMS (short message service), telephone, or IVR (interactive voice recognition).

One advantage of the disclosed techniques is that users are provided with payment methods that are convenient and highly customizable. For example, the payment method is configurable to include rules parameters, which cause particular types of transactions to withdraw all funds for that transaction from a particular type of account. Also, users are able to link a financial product to one or more core accounts from which funds are withdrawn or debited. Linking the financial product to multiple core accounts allows users to easily maintain a more even distribution of funds across their financial accounts. Additionally, the payment method can also be configured with spillover parameters that help users to avoid overdraft fees and/or declined transactions.

BRIEF DESCRIPTION OF THE DRAWINGS

So that the manner in which the above recited features of the present invention are attained and can be understood in detail, a more particular description of the present invention, briefly summarized above, may be had by reference to the embodiments thereof which are illustrated in the appended drawings. It is to be noted, however, that the appended drawings illustrate only typical embodiments of the present invention and are therefore not to be considered limiting of its scope, for the present invention may admit to other equally effective embodiments.

DETAILED DESCRIPTION

Figure 1:
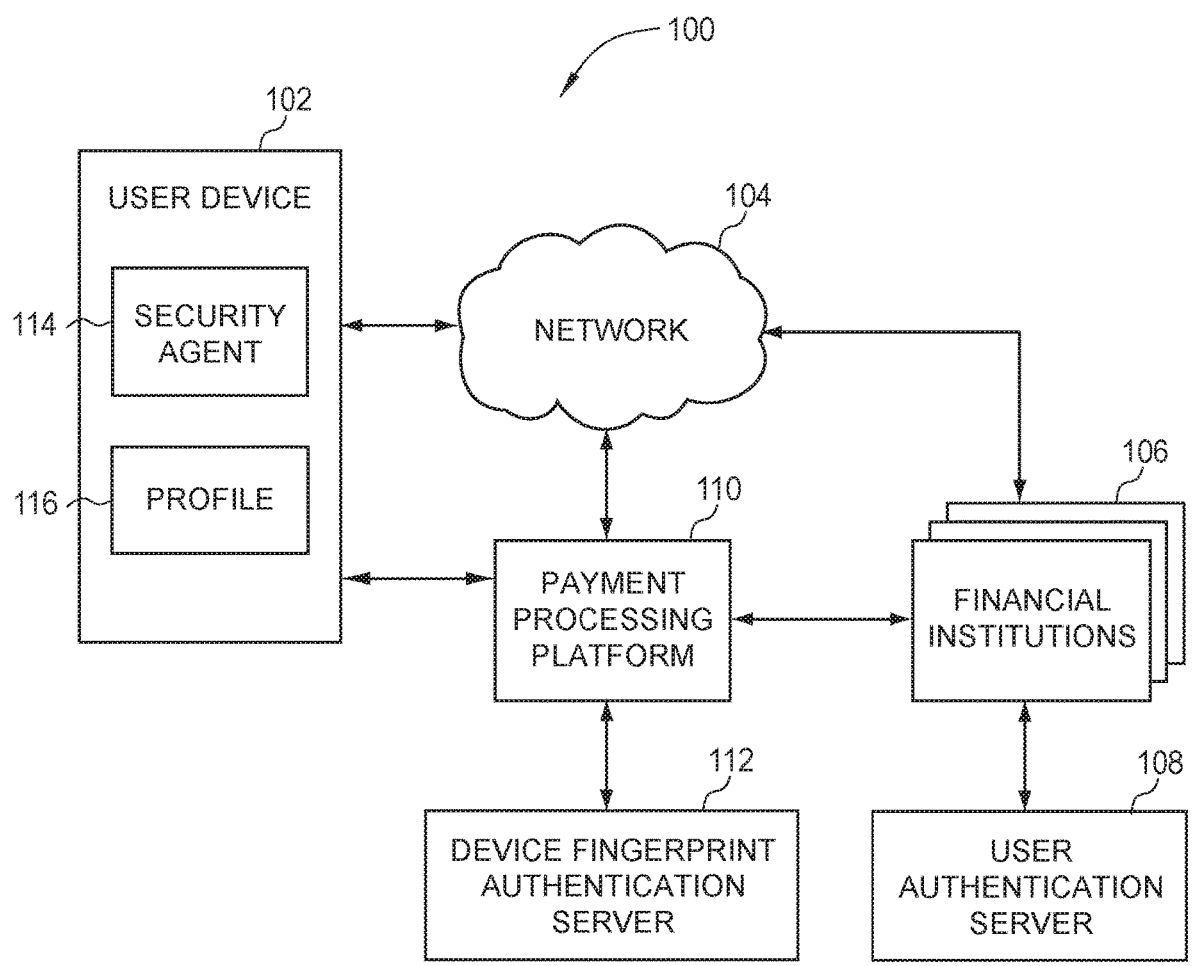
FIG. 1 is a block diagram illustrating components of a system configured to implement one or more aspects of the invention.

FIG. 1 is a block diagram illustrating components of a system 100 configured to implement one or more aspects of the invention. As shown, the system 100 includes a user device 102, a network 104, one or more financial institutions 106, a user authentication server 108, a payment processing platform 110, and a device finger print authentication server 112.

The user device 102 may be any type of individual computing device such as, for example, a desktop computer, a laptop computer, a hand-held mobile device, a personal digital assistant, or the like. Alternatively, the user device 102 may be any other device, such as a standard telephone, or an ATM terminal for a financial institution, or a terminal used by a customer representative at a financial institution, or the like. In one embodiment, the user device 102 is configured to be in communication with the other components in the system 100 via the network 104. The network 104 may be any type of data network, such as a local area network (LAN), a wide area network (WAN), cellular communications network, the Internet, a voice network such as a standard telephone network, or combinations thereof.

As is described in greater detail below, in some embodiments of the invention, a user may generate a "child product" that is linked to one or more "core accounts" held with one or more financial institutions 106. In various embodiments, the one or more core accounts may be standard accounts held with the financial institutions 106, including a checking account, a savings account, a home equity line of credit, a money market account, a credit card account, a debit card account, a prepaid card account, a gift card account, a healthcare savings account, an educational savings account, an employee benefits account, a promotion fund account, a rewards account (e.g., mileage or rewards points) or the like. In other embodiments, the core account may be associated with any type of billed account, including a utility bill account, cable account, satellite television account, phone service account, cell phone account, or the like. The child product may be used to make payment transactions and the payment transactions may be processed as if the payment transactions were made using the one or more core accounts. For example, a child product that is linked to both a checking core account and a credit card core account is processed by the financial institution legacy systems of each respective core account. Additionally, the child product may be used to deliver promotional coupons and/or to pay a salary of employees. In other use examples, the child product may be used to make an accounts payable transaction. In further embodiments, control parameters may be added to the child product, restricting the usage of the child product, as described in greater detail below.

In one embodiment, when a user wishes to generate the child product, the user may direct the user device 102 to navigate to a webpage of the one or more financial institutions 106. In another embodiment, the user may use an ATM terminal at a financial institution to generate the child product. In yet another embodiment, the user may request the generation of a child product through a customer service representative at a branch location of a financial institution. In yet another embodiment, the user may request the generation of a child product through a customer service representative at a customer support call center of the financial institution. In still further embodiments, the user may request the generation of the child product directly from the payment processing platform 110. In still further embodiments, the user may request generation of the child product via short message service (SMS) message, email message, or by phone via IVR (interactive voice recognition).

As described in greater detail below, the user may need to authenticate with the one or more financial institutions 106 before the child product is generated. In one embodiment, authentication includes the user being prompted to enter a username and/or password. In alternate embodiments, the user may be prompted to swipe an ATM card and enter a PIN number to authenticate. In yet additional embodiments, the user may be asked to show a driver's license or a government-issued photo identification to authenticate with the one or more financial institutions 106. In still further embodiments, the user may place a telephone call to the customer service phone number of the one or more financial institutions. Authentication may involve the user being asked questions to verify the identity of the user. In alternative embodiments, a third-party other than the financial institutions, may offer the ability to generate child products. In these embodiments, the user may be authenticated using any of the authentication methods described in relation to authenticating with a financial institution, as described below in conjunction with FIG. 8.

In another embodiment, to provide an additional layer of security, the user device 102 may include a security agent 114 and device profile 116. After the user has been authenticated with the one or more financial institutions 106, the payment processing platform 110 may prompt the security agent 114 installed on the user device 102 for the device profile 116 of the user device 102. The security agent 114 transmits the device profile 116 to the payment processing platform 110. The received device profile 116 is compared to data stored in the device finger print authentication server 112 that may include a listing of approved/authenticated user devices associated with each user. In one embodiment, each time that a user attempts to authenticate with a different user device 102, a confirmation code is sent to an e-mail address for the user that the user enters before the user device is authenticated. In alternative embodiments, the confirmation code may be sent to the user via an SMS message, an email message, or via any other electronic means including by telephone. Once a particular user device 102 has been confirmed, the device profile 116 of the user device 102 is stored in the database of the device finger print authentication server 112. The next time the user attempts to authenticate using that particular user device 102, the device profile 116 of the user device is recognized by the device finger print authentication server 112 and the user is authenticated. Once the user is properly authenticated, the user may generate the child product.

In still further embodiments, control parameters are applied to the core account held with the one or more financial institutions 106. In these embodiments, a child product may or may not be generated.

Figure 2:
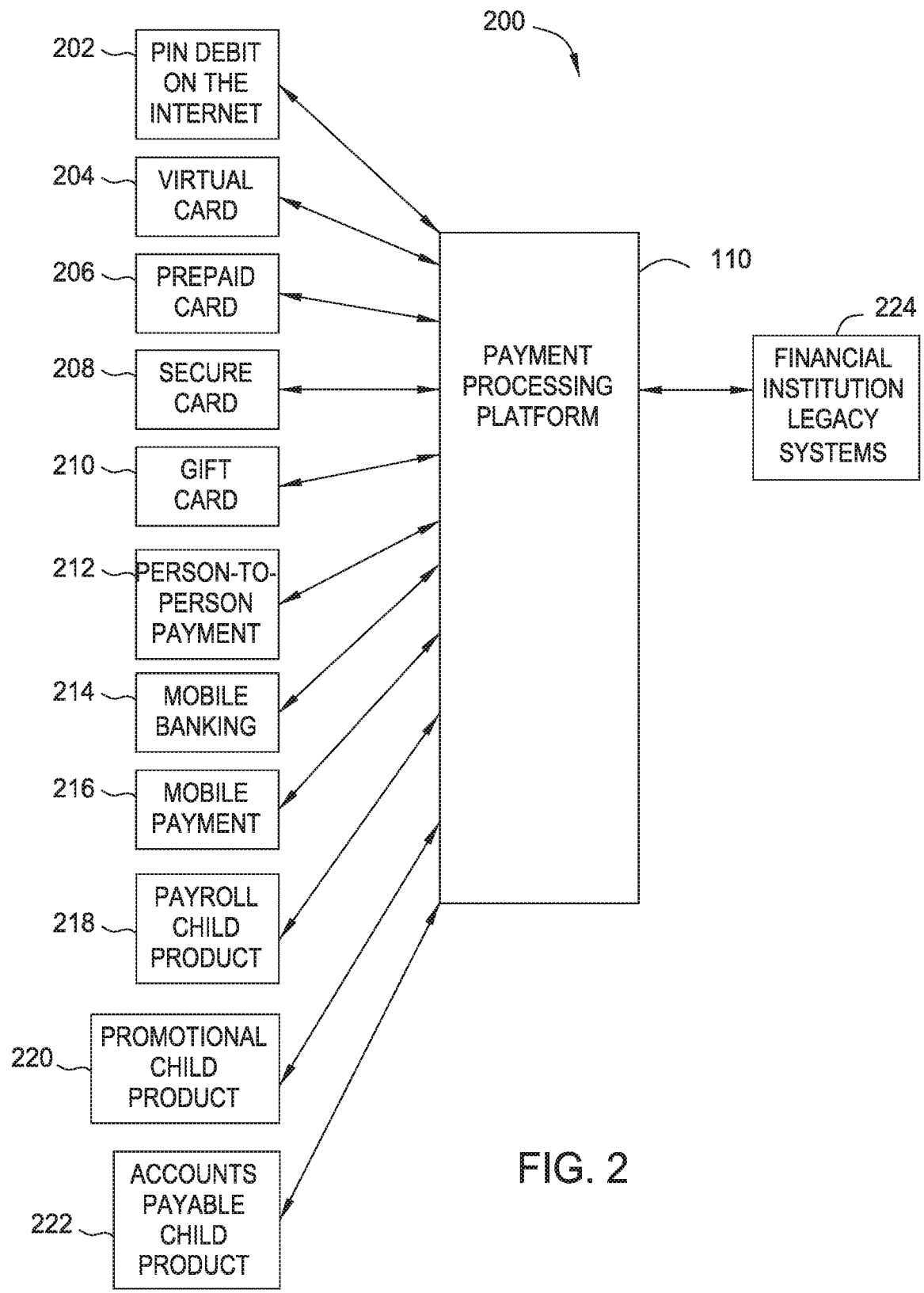
FIG. 2 is a conceptual illustration of a system including a payment processing platform, according to one embodiment of the invention.

FIG. 2 is a conceptual illustration of a system 200 including a payment processing platform 110, according to one embodiment of the invention. As shown, the payment processing platform 110 serves as a processor between various child products 202-222 and financial institution legacy systems 224. However, in other embodiments, the payment processing platform 110 may reside between any number of financial systems. Child products may include a PIN debit child product 202, a virtual card child product 204, a prepaid card child product 206, a secure card child product 208, a gift card child product 210, a person-to-person payment child product 212, a mobile banking child product 214, a mobile payment child product 216, a payroll child product 218, a promotional child product 220, or an accounts payable child product 222. One or more child products 202-222 are delivered to a recipient that may use the child products 202-222 to make a payment. In one embodiment, the recipient is the same individual as the user that generated the child product. In alternative embodiments, the recipient is different from the user that generated the child product.

As is known, in a debit transaction, a debit card or bank card is used to make a payment. The use of a debit card is functionally similar to writing a check, as the funds are withdrawn directly from the financial institution account of a customer. In a conventional PIN-debit card transaction at a physical merchant location, the customer may swipe or insert the debit card into a terminal and the transaction is authenticated by entering a personal identification number (PIN). However, PIN-debit transactions are not initiated on the Internet because customers are wary of entering their PIN number into a browser webpage for security reasons.

The PIN debit child product 202 allows for PIN debit transactions on the Internet. From a payment page of an online merchant, a user/customer may select a "Pay From My Financial Institution" payment option. At this point, the user/customer is authenticated through the financial institution's authentication server 108, as described above in FIG. 1. A virtual debit card number and a virtual PIN may be generated that are linked to the account of the user/customer held at the financial institution. The user/customer is able to initiate the online transaction as if the transaction was being made using a normal debit card. In this way, because the user/customer has already been authenticated with the financial institution through the financial institution's authentication server 108, the virtual PIN serves the same purpose as a real PIN from the merchant's perspective. In this way, the core account transaction is processed as a PIN debit transaction at the financial institution. In another embodiment, the payment processing platform receives a trigger from a merchant. In response, the payment processing platform transmits a listing of financial institutions offering the ability to generate child products to the merchant. A user/customer selects a financial institution from the listing and the user is authenticated through the financial institution's authentication server 108, as described above in FIG. 1

A virtual card child product 204 is a payment method for which non physical manifestation of child card is generated. A user may create a virtual card child product 204 as a virtual credit or debit card, having a seemingly "normal" credit/debit card number, which can be used by the customer for card-not-present transactions such as online transaction, or mail-order telephone orders (MOTO) transactions. In alternative embodiments, a virtual card child product 204 may be generated and the card number may be associated with the contactless payment options enabled by a mobile device such as a radio-frequency identification (RFID) tag of a mobile device to allow a customer to make contactless payments at a point-of-sale location. In further embodiments, a virtual card child product 204 may be generated and the customer may print out an image of the virtual card child product, optionally including other identifying information such as a bar code, and take the print-out to a merchant location as a form of payment.

The prepaid card child product 206 may be generated with a preloaded balance. A user may load the prepaid card child product 206 with a limit that cannot be exceeded. Additional control parameters may include a per-transaction limit, or impose further restrictions, as described below. The prepaid card child product 206 may be a physical card, a virtual card, or both a physical card and a virtual card.

A secure card child product 208 is a payment method where child product is generated that is linked to a core account. In one embodiment, transaction made using the secure card child product 208 may be processed similar to transactions made using the core account. Additional control parameters may limit a per-transaction limit, or impose further restrictions, as described below. The secure card child product 208 may be a physical card, a virtual card, or both a physical card and a virtual card.

The gift card child product 210 is a payment method that may be given to another as a gift. The gift card child product 210 may be a physical card, a virtual card, or both a physical card and a virtual card. A gift card child product 210 is different from a prepaid card child product 206 since no funds are withdrawn/charged to the core account when a gift card child product 210 is generated. A gift card child product 210 may still include a limit; however, funds are only withdrawn/charged to the core account when transactions are initiated with the gift card child product 210. In other words, a portion of credit available in the core account is allocated for use by a recipient of the gift card child product 210. This differs from the prepaid card child product 206 which is generated with a pre-loaded balance.

The person-to-person payment child product 212 may be generated and used as a form of payment from one person/entity to another as a form of payment. In one embodiment, the person-to-person payment child product 212, like other child products, may be used to pay for goods or services in merchant transactions. In alternative embodiments, the person-to-person payment child product 212 may be converted to cash. The conversion may be a dollar-for-dollar conversion based on the card limits of the person-to-person payment child product 212, or may be some other ratio.

Mobile banking child products 214 and mobile payment child products 216 may be generated using a mobile device. Similarly, transactions made using other child products may be made with a mobile device.

The payroll child product 218 may be generated by an employer and distributed to employees as a form of salary payment. Each payroll child product 218 may be linked to the same core account (such as the employer's bank account) and may be distributed as a physical card and/or a virtual card. The payroll child product 218 may be generated having few, if any, control parameters that restrict the use of the payroll child product 218. The payroll child product 218 is a convenient mechanism for employers to distribute salaries and bonuses, and the payroll child product 218 provides flexibility to employees who do not have a checking or savings account at a commercial bank. Once distributed, the payroll child product 218 may be used to initiate one or more child transactions at various merchant locations, including payment transactions and/or redemption transactions. Redemption transactions are transactions that convert the payroll child product 218 into cash or initiate a deposit of an equivalent amount of funds into an account held by the recipient at a financial institution. Redemption of the payroll child product 218 may occur through an ATM terminal, a commercial bank branch location, a check-cashing location, or any other mechanism. The payroll child products 218 may include few, if any, control parameters other than value of the child product to provide recipients with maximum flexibility in how they use the funds linked to the payroll child product 218.

The promotional child product 220 may be generated by a merchant or franchisor and distributed to customers as a form of "coupon" or promotional discount. Promotional child products 220 can be mass-distributed to multiple customers, where each promotional child product 220 is linked to the same core account. Each promotional child product 220 may include the same values for the control parameters, such as expiration date, coupon value, and geographic region where the promotional child product 220 may be redeemed. In alternative embodiments, the control parameters (e.g., the value of the promotional child product 220) may vary for different customers based on certain criteria. For example, a franchisor may generate promotional child products 220 providing a $5.00 discount on purchases for customers in California, but the franchisor may generate promotional child product 220 providing a $3.00 discount on purchases for customers in Arizona for the same promotion. The promotional child product 220 may be delivered to the customers by the payment processing platform 110 via text message, e-mail, physical card, virtual card, and/or any other technically feasible medium.

The accounts payable child product 222 may be generated by a payor business and transmitted to a payee business as a form of payment. For example, a payor business may receive a bill for $10,000.00 for goods or services rendered by a payee business. The payor business may then cause an accounts payable child product 222 to be generated by the payment processing platform 110 with control parameters limiting the accounts payable child product 222 to a single transaction with a maximum transaction amount of $10,000.00. The accounts payable child product 222 is then delivered to the payee business, whereupon the payee business redeems the accounts payable child product 222. Redemption of the accounts payable child product 222 may occur through an ATM terminal, a commercial bank branch location, a check-cashing location, transfer of funds from an account held by the payor to an account held by the payee, or any other mechanism. Upon redemption, $10,000.00 is transferred from a financial institution of the payor business to a financial institution of the payee business. In some embodiments, additional control parameters can be added to the accounts payable child product 222, such as an expiration date or a particular geographical region that limits the boundaries of redemption. These additional control parameters allow for enhanced security and efficiency of the transaction between the payor business and the payee business.

As described in greater detail below, any of the "child products" 202-222 described above may be applicable in the context of the core account. For example, control parameters may be added to a core account by executing the method steps 802-812 described in FIG. 8.

Figure 3A:
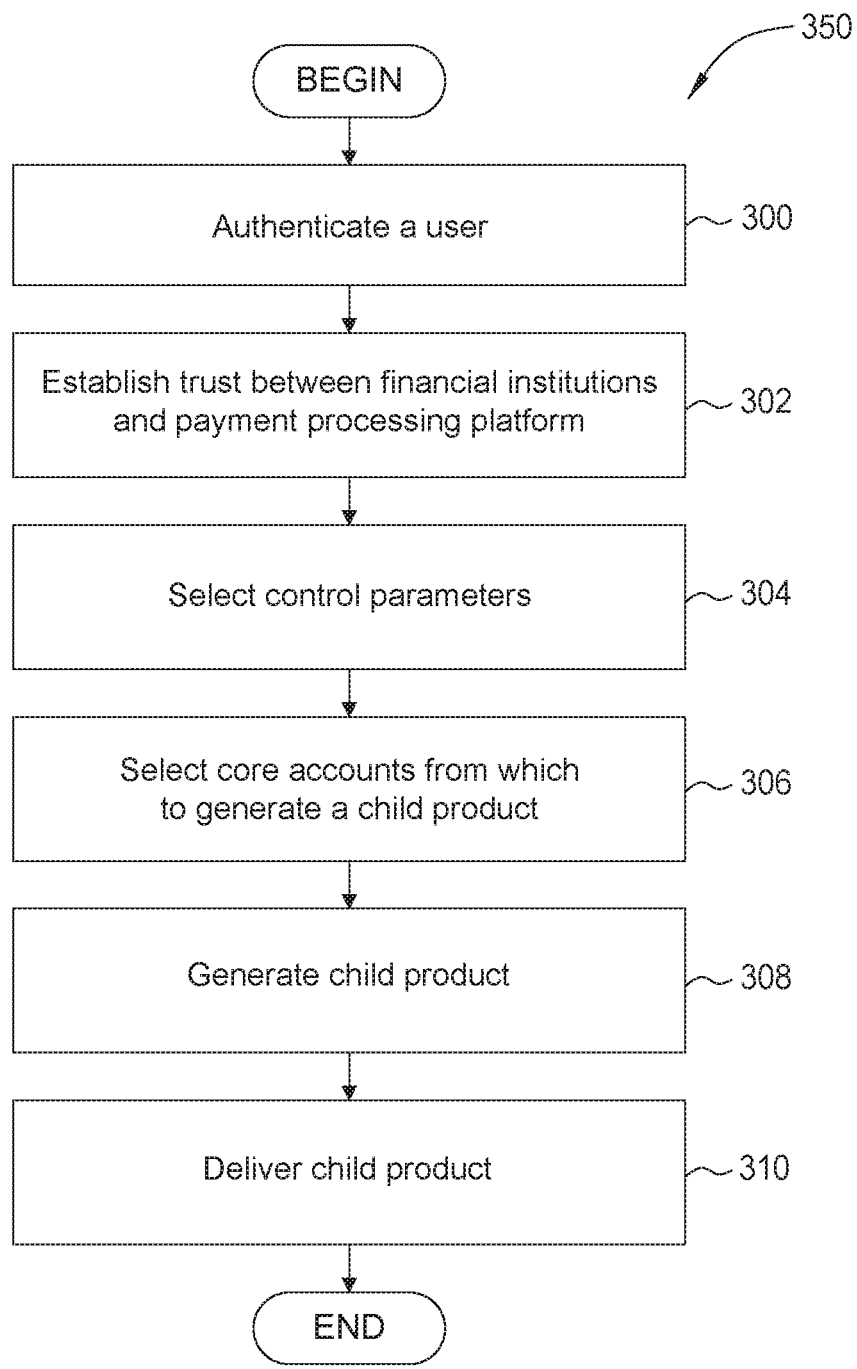
FIG. 3A is a flow diagram of method steps for generating a child product, according to one embodiment of the invention.

FIG. 3A is a flow diagram of method steps for generating a child product, according to one embodiment of the invention. Persons skilled in the art will understand that, even though the method 350 is described in conjunction with the systems of FIGS. 1 and 2, any system configured to perform the steps of the method 350 illustrated in FIG. 3A, in any order, is within the scope of the invention.

As shown, the method 350 begins at step 300, where a user is authenticated. In one embodiment, the user may be authenticated by entering a username and password into a log-on screen of a financial institution website. In alternative embodiments, a third-party other than a financial institution may offer the ability to generate child products. In these embodiments, the user may be authenticated by entering a username and password into a log-on screen of the third-party website. In yet further embodiments, the device with which the user is attempting to authenticate himself is verified by comparing a device profile for the user device against a database of user devices previously registered by the user, as described in reference to FIG. 1.

In alternate embodiments, the user may be prompted to swipe an ATM card and enter a PIN number to authenticate. In yet additional embodiments, the user may be asked to show a driver's license or a government-issued photo identification to authenticate with the one or more financial institutions 106. In still further embodiments, the user may place a telephone call to the financial institution customer service phone number to generate a child product. Authentication may involve the user being asked questions to verify the identity of the user. For example, the user may be asked to verify a social security number and/or mother's maiden name. In yet other embodiments, the user may be authenticated using biometric characteristics. In still further embodiments, a user may be authenticated by a phone number used in sending an SMS or performing a voice call via a service provider, with or without a PIN number being provided.

Once the user is properly authenticated, the method 350 proceeds to step 302, where a trust is established between the one or more financial institutions 106 and the payment processing platform 110. In another embodiment, at step 302, a trust is established between a third party, other than a financial institution, that may be responsible for authentication and the payment processing platform 110. One embodiment of step 302 is described in greater detail in FIG. 3B.

Figure 3B:
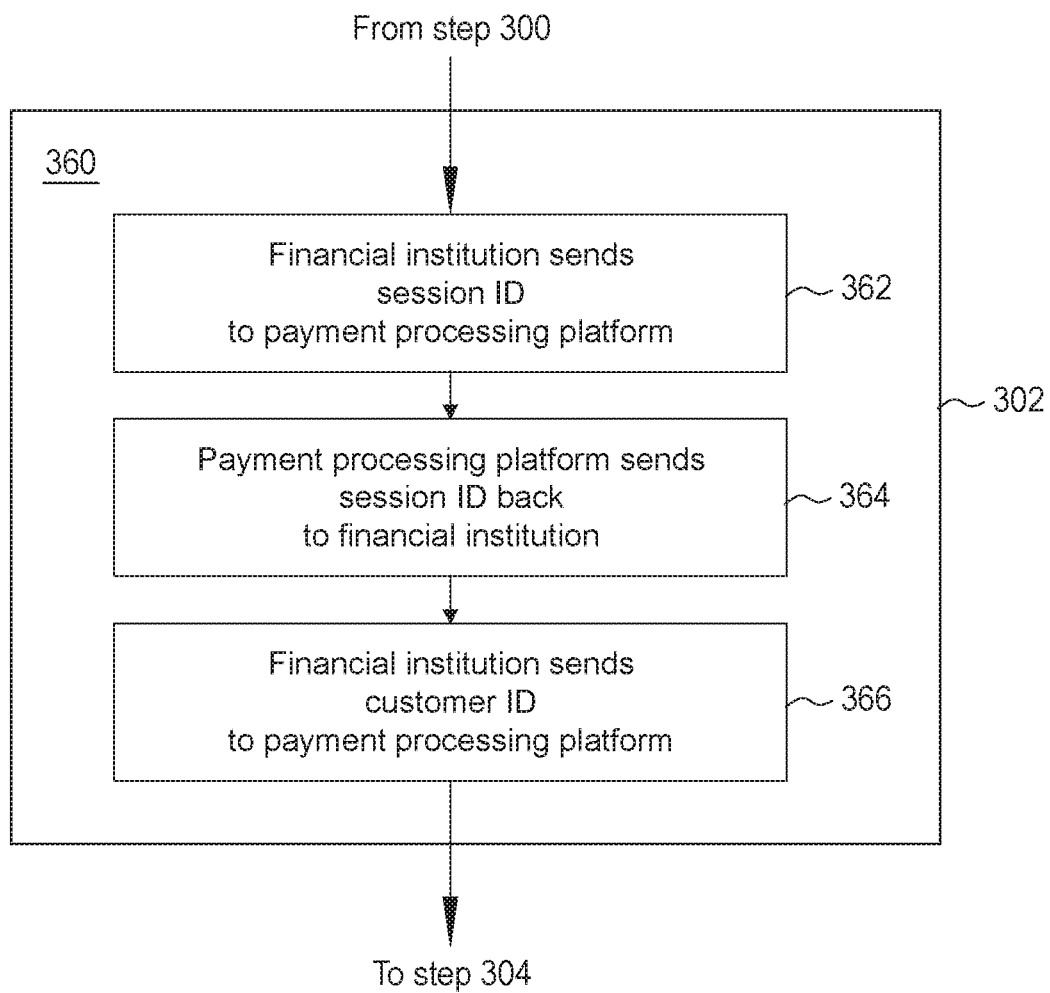
FIG. 3B is flow diagram of method steps for establishing trust between a financial institution and a payment processing platform, according to one embodiment of the invention.

FIG. 3B is flow diagram of method steps for establishing trust between a financial institution 106 and a payment processing platform 110, according to one embodiment of the invention. Persons skilled in the art will understand that, even though the method 360 is described in conjunction with the systems of FIGS. 1 and 2, any system configured to perform the steps of the method 360 illustrated in FIG. 3B, in any order, is within the scope of the invention.

As shown, the method 360 begins at step 362, where the financial institution 106 sends a session identifier (session ID) to the payment processing platform 110 to begin the trust establishment process. Next, at step 364, the payment processing platform 110 sends the session ID back to the financial institution 106 through a back door to verify that the financial institution 106 had indeed sent that session ID, rather than a hacker, for instance. It should be noted that the exchange of the session ID is not the only means of establishing trust between the systems 106, 110; rather, trust may be established by any means known in the art without departing from the principles of the invention. Then, at step 366, the financial institution 106 sends a customer identifier (customer ID) to the payment processing platform 110. In one embodiment, within the servers of the payment processing platform 110, the customer ID may be used to translate from a child product card number to a "real" account number, as described in greater detail below.

Referring back to FIG. 3A, at step 304, control parameters are selected. In one embodiment, control parameters include a series of restrictions on transactions made with the child product. For example, the control parameters may include, but are not limited to, a card spending limit, a per-transaction spending limit, a daily spending limit, a weekly spending limit, a limit on number of transactions in a given period of time, a name on card, an activation date, an expiration date, a country of use, a merchant of use, a merchant category, a time of day, a day of week, a date of month, a merchant channel (online, point-of-sale), a reset frequency for resetable cards, a geographical region for valid redemption, and the like.

When a child product is attempted to be used in a transaction, the transaction details may be checked against the control parameters stored for the child product. In one embodiment, if at least one of the control parameters is not satisfied, then the transaction is rejected. If each of the control parameters satisfy those stored for the child product, the transaction proceeds to processing, as described in greater detail below in FIGS. 6 and 7. In alternative embodiments, if a minimum number of control parameters are satisfied, then the transaction is approved. For example, a child product may include five control parameters and a transaction is approved if four out of five control parameters are satisfied. In still further embodiments, control parameters may be assigned "weights" such that a transaction is approved if the sum of the weights assigned to the satisfied control parameters exceeds a minimum value. For example, a per-transaction limit control parameter may be assigned a weight of five, a merchant category control parameter may be assigned a weight of four, a merchant name parameter may be assigned a weight of three, and all other control parameters may be assigned a weight of two. In this example, a transaction may be approved if the sum of the satisfied control parameters exceeds ten. As will be understood by those having ordinary skill in the art, other techniques for comparing the transaction details against the control parameters stored for the child product may be available.

Referring back to FIG. 3A, at step 306, one or more core accounts are selected from which to generate a child product. In one embodiment, the one or more core accounts may be any type of financial account held with a financial institution. For example, the core accounts may include a checking, savings, home equity, credit card account, or the like. When a child product is generated from one or more core accounts, any transactions made using the child product are processed as though the transaction was made using the one or more core accounts, as is described in greater detail below.

Figure 4:
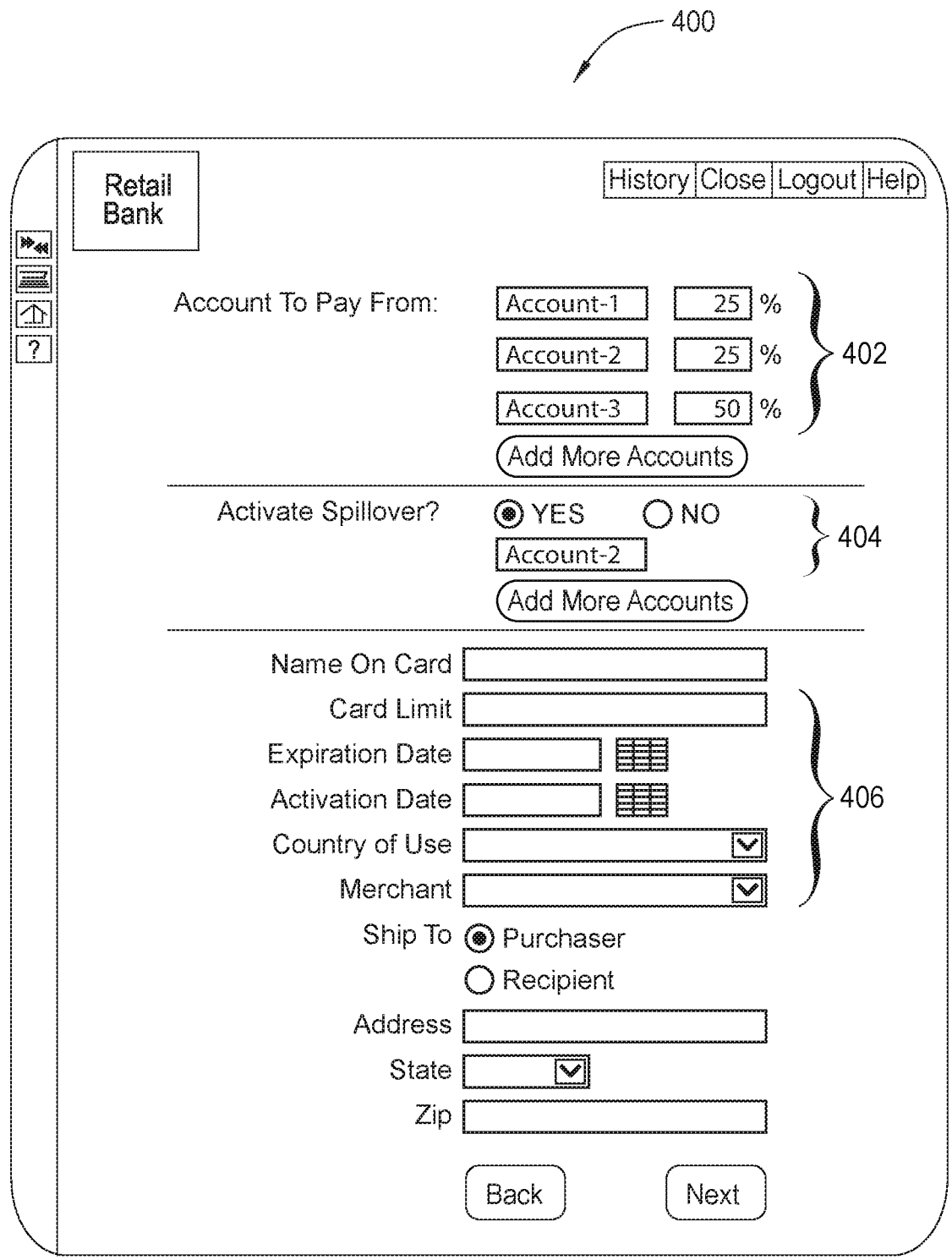
FIG. 4 is a screen shot illustrating selection of various parameters for a child product, according to one embodiment of the invention.

FIG. 4 is a screen shot 400 illustrating selection of various parameters for a child product, according to one embodiment of the invention. As shown an interface allows a user to select one or more core accounts 402, a spillover feature 404, and control parameters 406 for the child product. In one embodiment, the selection of the one or more core accounts 402 may be included in a single screen along with the selection of spillover activation 404 and the selection of the control parameters 406. As shown, the selection of core accounts 402 allows for the child product to be linked to multiple core accounts, where each selected core account contributes a particular percentage of the total funds required to complete each transaction initiated using the child product. In other embodiments, each of the plurality of core accounts may be associated with a maximum amount to be withdrawn or debited in one child transaction. In addition, the parameters may include rules (not shown) which cause particular types of transactions to withdraw all funds for that transaction from a particular type of account. For example, the user may configure a child product to, when purchasing airline tickets, withdrawal the funds only from a credit-card account.

In some embodiments, the selection of spillover activation 404 allows for the child product to be protected from overdrawing from one or more of the core accounts associated with the child product. In some embodiments, the selection of the control parameters 406 includes selection of card limit, expiration date, activation date, country of use, and/or merchant of use. As one having ordinary skill in the art will appreciate, additional control parameters may be selected for the child product, including merchant category (e.g., "restaurants"). For convenience, each child card may be given a name to remind a user of the purpose of a child card. Additional details regarding linking the child product to multiple core accounts and activating the spillover feature are described in greater detail below. Additionally, the child product may be configured to allow for split tender transactions. As shown in FIG. 4, the child product is associated with three core accounts—Account-1, Account-2, and Account-3. When the child product is used in a payment transaction, 25% of the cost will be deducted from Account-1, 25% of the cost will be deducted from Account-2, and 50% of the cost will be deducted from Account-3. These percentages can be configurable at the time the child product is generated or modified at a later time. Additionally, in other embodiments, each of the plurality of core accounts is associated with a maximum amount of funds to be withdrawn for a single core account transaction. Again, the maximum values for each core account are configurable at the time the child product is generated or modified at a later time. Configuration of these split tender parameters can be done using any technically feasible mechanism, including via a webpage, email or SMS message, IVR, or any other technique.

Referring back to FIG. 3A, at step 308, a child product is generated. In one embodiment, the child product is generated having a 16-digit card number, a card identification value, an expiration date, and a name on card. As is known, a card number includes a Bank Identification Number or BIN number. The BIN number is generally a one- to six-digit number that identifies the financial institution that issued the credit/debit card. In one embodiment of the invention, the child product generated at step 308 includes a BIN number that identifies that the child product as being issued by the payment processing platform 110. In alternative embodiments, the generated child card may include a BIN number within a range that identifies that the child product is associated with a particular financial institution, but is nevertheless a child product. In still further embodiments, depending on the categories of the selected core accounts, the financial institution may request that the payment processing platform issue a child product of a particular type. For example, if the user selects a credit card account as the core account, then the generated child product may include a BIN number that identifies that child card as being a credit card that is processed through a particular card network.

Figure 5:
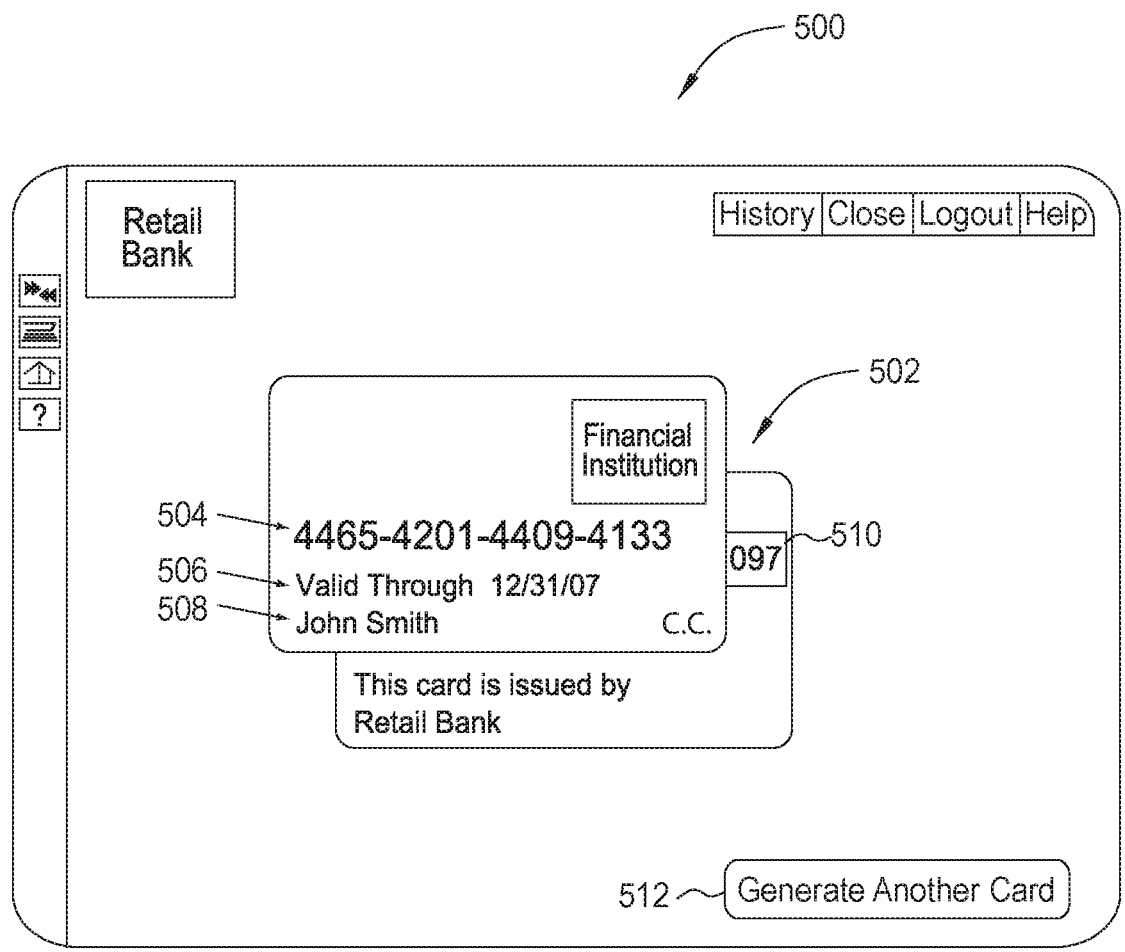
FIG. 5 is a screen shot illustrating a generated child product, according to one embodiment of the invention.

FIG. 5 is a screen shot 500 illustrating a generated child product 502, according to one embodiment of the invention. As shown, the child product 502 includes a card number 504, expiration date 506, name 508, and card identification value 510. As described above, a physical card may be requested and mailed to the address input when generating the child product 502. Alternatively, the child product 502 may be delivered electronically as a virtual card, or the child product 502 may be delivered both physically and electronically. The child product 502 can be used at a physical merchant or at a card-not-present merchant, such as online merchants, or mail-order telephone orders (MOTO) merchants, or any other place where a card is accepted as a payment instrument. In one embodiment, a virtual card may be generated and the card number may be associated with the contactless mobile payment solution such as a radio-frequency identification (RFID) tag of a mobile device to allow a user to make contactless payments at a point-of-sale location. In further embodiments, a virtual card may be generated and the user may print out an image of the virtual card child product, optionally including other identifying information such as a bar code, and take the print-out to a merchant location as a form of payment. In one embodiment, the card identification value is a Card Verification Value, like CVV, CVV2, PIN number, or any other card identification value.

Referring back to FIG. 3A, at step 310 the child product is delivered to the customer. In one embodiment, the child product may be a physical card that is mailed to the customer or to the recipient. In alternative embodiments, the child product may be a virtual card that is available to the customer/recipient through a web browser. Alternatively, the child product may be a virtual card that is e-mailed to the customer/recipient, sent using a SMS, sent using any electronics medium, or delivered over the phone. A virtual card is a payment method for which a non physical manifestation of child card is generated. In some embodiments, a physical manifestation is also generated in addition to the non-physical virtual card. A user may create a virtual card as a virtual credit or debit card, having a seemingly "normal" credit/debit card number, which can be used by the customer for card-not-present transactions such as online transaction, or mail-order telephone orders (MOTO) transactions. In alternative embodiments, a virtual card may be generated and the card number may be associated with the contactless payment options enabled by a mobile device such as a radio-frequency identification (RFID) tag of a mobile device to allow a customer to make contactless payments at a point-of-sale location. In further embodiments, a virtual card may be generated and the customer may print out an image of the virtual card child product, optionally including other identifying information such as a bar code, and take the print-out to a merchant location as a form of payment.

Figure 6:
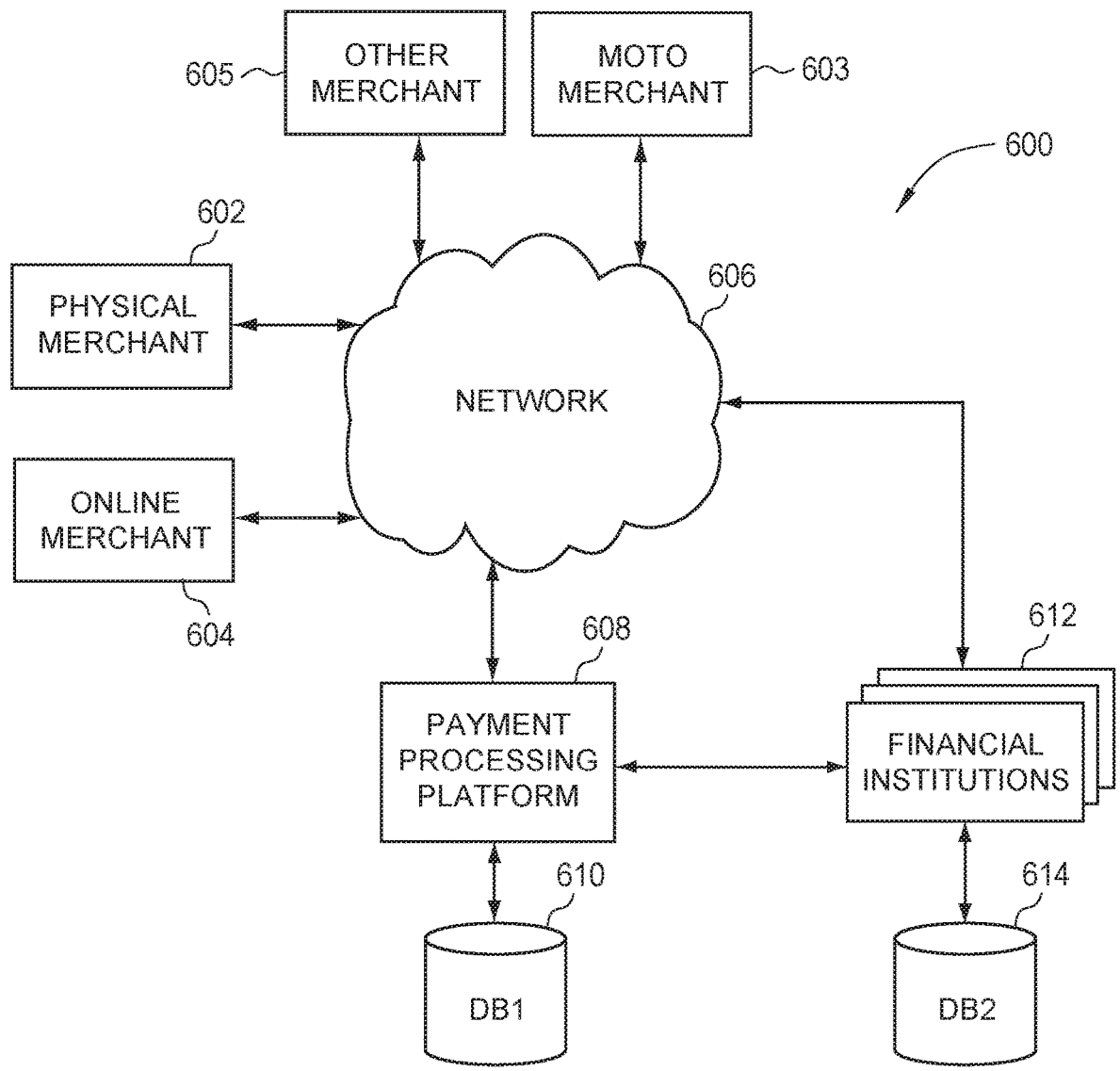
FIG. 6 is a block diagram illustrating components of a system configured to process a child transaction and a core account transaction, according to embodiments of the invention.

FIG. 6 is a block diagram illustrating components of a system 600 configured to process a child transaction and one or more core account transactions, according to embodiments of the invention. As shown, the system 600 includes the physical merchant 602, mail-order telephone orders (MOTO) merchant 603, online merchant 604, other merchant 605, a network 606, a payment processing platform 608, a first database 610, one or more financial institutions 612, and a second database 614.

In one embodiment, a transaction initiated with a child product is known as a "child transaction." In some embodiments, the child product comprises a financial product that is linked to one or more core accounts. As described above, a child product may be delivered in the form of a physical card mailed to a customer or to a recipient. Alternatively, the child product may be delivered electronically as a virtual card. Alternatively, the child product may be delivered both physically as a physical card and electronically as a virtual card. Both the physical card child product and the virtual child card product may be used at any physical merchant 602, MOTO merchant 603, online merchant 604, or other merchant 605 that accepts regular credit cards, debit cards, prepaid cards, and the like.

A child transaction may be initiated at the physical merchant 602. For example, a cashier at the physical merchant 602 may swipe the physical child product through a card reader. Alternatively, a child product may be delivered virtually on a user's mobile device and a user at the physical merchant 602 may wave his/her mobile device in front of a contact-less card reader. In still further embodiments, the customer may show his/her mobile device to a cashier at the merchant location who manually enters the card number of the child product. Alternatively, the mobile device may include a contactless chip or tag that is wireless readable.

In one embodiment, the network 606 is a card network. In alternative embodiments, the network 606 is an electronic funds transfer (EFT) network or a private network. For example, the child product may be a credit card child product, in which case child transaction information is sent to the appropriate credit card network. Similarly, the child product may be a signature debit card child product, in which case the child transaction information is sent to the appropriate debit card network. In other embodiments, the child product may be a PIN debit card, in which case the child transaction information is sent to the appropriate EFT network. Additionally, the child product may be a special card, in which case the child transaction information is sent to the appropriate private network.

In one embodiment, when a child transaction is received by the network 606 and identified as having a BIN number in the range associated with the payment processing platform 608, then the child transaction is routed to the payment processing platform 608. In another embodiment, when a child transaction is received by the network 606 and identified as having a special BIN number in the range associated with a financial institution of the core account, then the child transaction is routed to the payment processing platform 608.

When a child transaction is received by the payment processing platform 608, the payment processing platform 608 may then compare the child transaction details with control parameters stored for that particular child product in the first database 610. As described above, the comparison may require that each control parameter stored for the child product is satisfied, that a minimum number of control parameters are satisfied, or that a sum of the weights assigned to control parameters that are satisfied exceeds a minimum threshold. In one embodiment, if at least one of the control parameters is not satisfied, then the payment processing platform may return a decline response to the network 606 and the child transaction is denied. If each of the control parameters is satisfied, then the card number of the child product is linked to the one or more "real" account numbers of the core accounts to which the child product is linked. Additionally, if the child product comprises a core account with control parameters, then a "real" account number is already known and no mapping is performed. Further, in some embodiments, the child product includes a card number that is the same as one of the core accounts that provides financial backing for the child product.

In one embodiment, the second database 614 contains the mapping from child product card number to one or more core account numbers associated with the child product, and may be located on the systems of the financial institutions 612. In alternative embodiments, the second database 614 may reside on systems operated by the payment processing platform 608. In yet another embodiment, database 610 and 614 may be combined. Once the one or more core account numbers are determined, one or more core account transactions are generated and transmitted to the network 606 for normal routing and processing as a core account transactions. Each core account transaction is sent to the respective financial institution that issued the core account. The processing system at the financial institution that issued a particular core account processes the core account transaction in normal fashion and approves or denies the transaction based on a normal set of processing rules. For example, in a particular embodiment, a child account is linked to three core accounts, where the first core account is a checking account, the second core account is a savings account, and the third and core account is a credit card account. Each of the three core accounts is configured to contribute one-third of the overall cost of any transaction that is generated using the child product. When a child product transaction is generated, three individual core account transactions are generated by the payment processing platform 608 for the checking, savings, and credit card accounts, respectively. Each of the individual core account transactions withdrawals one-third of the total child transaction cost from its respective core account. Thus, in this example, subsequent to a completed child transaction, an even distribution of funds is maintained across the linked core accounts.

In embodiments where the child transaction is received at a merchant and transmitted from the financial institution 612 to the payment processing platform 608, the core account transaction generated by the payment processing platform 608 is transmitted to the financial institution 612, bypassing the network 606.

A similar child transaction may be initiated from an online merchant 604, from a MOTO merchant 603, or from any other merchant 605. In one embodiment, the user may input the child product card number into a payment webpage and an online child transaction is initiated. In another embodiment, the user may submit the child product card number to a customer service representative at a MOTO merchant 603. In yet another embodiment, the user may submit the child product card number in a mail order form to a MOTO merchant 603. A child transaction initiated at a MOTO merchant 603, at an online merchant 604, or at any other merchant 605 may be processed in similar fashion to a child transaction initiated at the physical merchant location 602.

Figure 7:
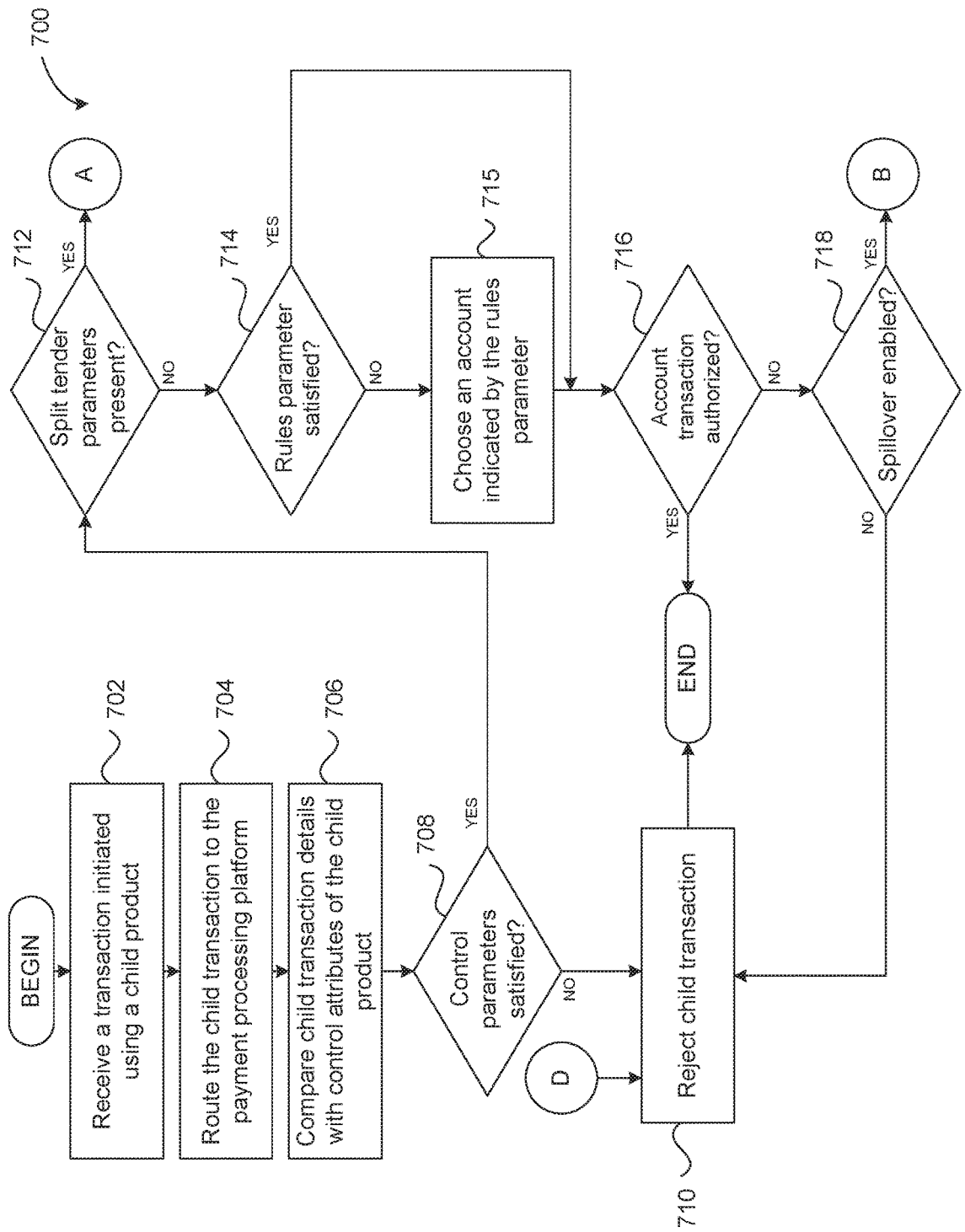
FIG. 7 is a flow diagram of method steps for processing a transaction, according to one embodiment of the invention.
Figure 7:
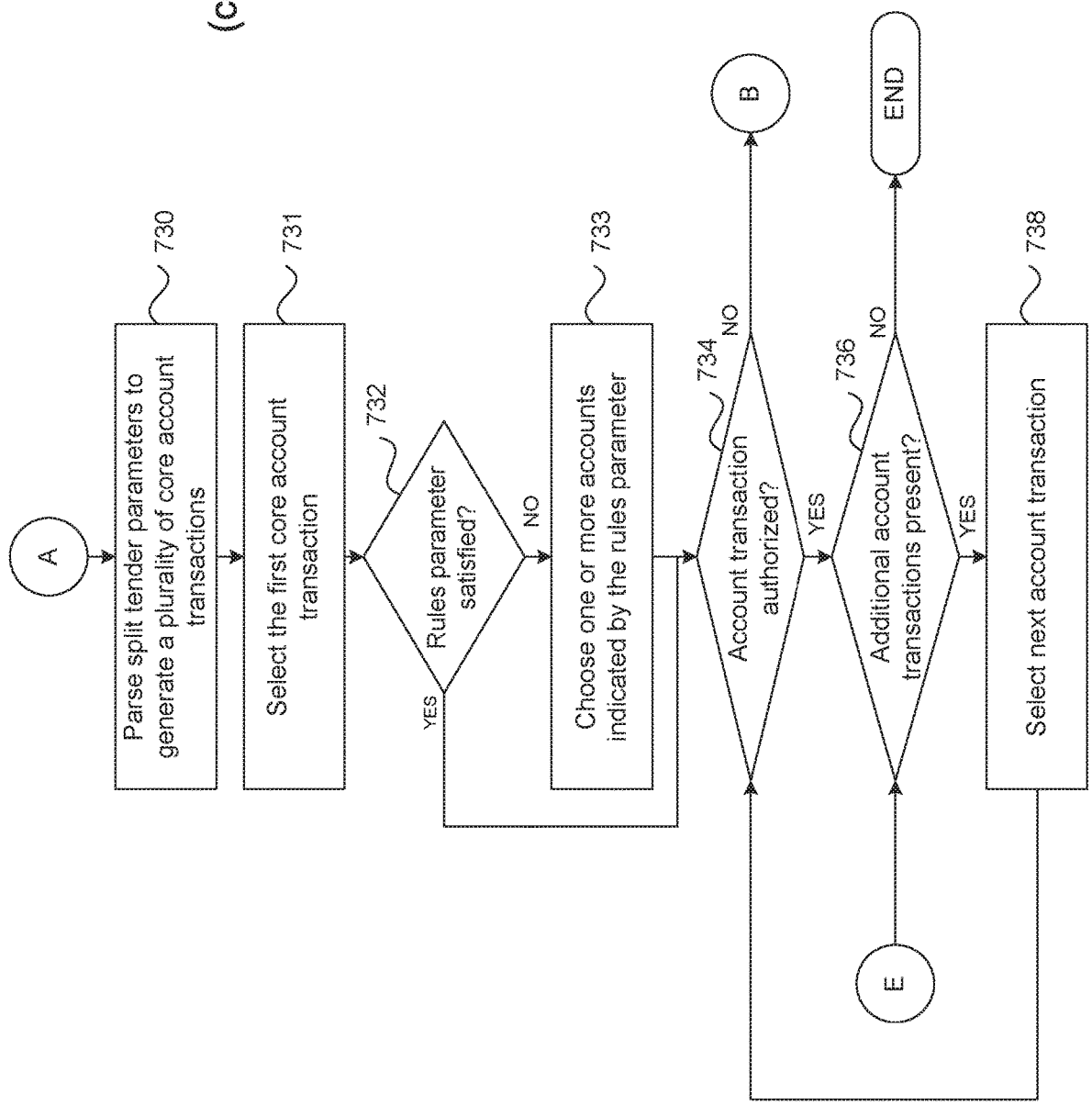

FIG. 7 is a flow diagram of method steps for processing a child transaction, according to one embodiment of the invention. Persons skilled in the art will understand that, even though the method 700 is described in conjunction with the systems of FIGS. 1, 2, and 4-6 any system configured to perform the steps of the method 700 illustrated in FIG. 7, in any order, is within the scope of the invention.

As shown, the method 700 begins at step 702, where a merchant receives a child transaction initiated using a child product. In one embodiment, the merchant is a physical merchant and the child transaction is initiated by, e.g., the child product (physical card) being swiped through a credit card reader, the child product virtual card being waved in front of a contactless card reader, the virtual card being read by a bar code reader, or by a merchant reading a card number from device or a print out. In alternative embodiments, the merchant is an online merchant, MOTO merchant, or other merchant that receives a child product card number that is input into a payment webpage of the online merchant website, over the phone, via a mail-order, or via any other means.

At step 704, the child transaction is routed to the payment processing platform. As described above, a child product includes a BIN number or a number within a BIN number range that identifies the child product as such. In one embodiment, the child transaction is passed directly to the payment processing platform from the merchant, bypassing the network. In alternative embodiments, the child transaction is passed from the merchant to a network. In alternative embodiments the child transaction is passed from a merchant to the financial institution 612 and then passed to the payment processing platform 608. As described, the child product may be a credit card, in which case the child transaction information is sent to the appropriate credit card network. Alternatively, the child product may be a signature debit card, in which case the child transaction information is sent to the appropriate debit card network. The child product may be a PIN debit card, in which case the child transaction information is sent to the appropriate EFT network. The child product may be a special card, in which case the child transaction information is sent to the appropriate private network. In further embodiments, the child transaction is processed through multiple networks before ultimately being routed to the payment processing platform. In one embodiment, to the merchant, the child transaction may proceed as though the payment processing platform is the "issuer" of the child product with which the child transaction is initiated.

At step 706, the payment processing platform compares the child transaction details with control parameters of the child product. As described above, each child product is associated with a series of control parameters that are stored in a first database DB1, referenced by child product. When the child transaction is received by the payment processing platform, the child product card number may be used as a reference pointer to determine the associated control parameters stored in the first database DB1.

At step 708, the payment processing platform determines whether the control parameters of the child transaction satisfy the control parameters stored in the first database DB1. If the payment processing platform determines that the control parameters of the child transaction do not satisfy the control parameters stored in the first database DB1, then the method 700 proceeds to step 710 where the child transaction is rejected and a denial is returned. In one embodiment, if the child transaction was routed from the merchant to the payment processing platform bypassing the network, then the denial is returned directly to the merchant. In alternative embodiments, if the child transaction was routed through a network to the payment processing platform, then the denial is returned to the network and routed to the merchant. In yet another embodiment, if the transaction was routed from the financial institution, then the denial is returned to that financial institution.

As described above, the determination of whether the control parameters are satisfied at step 708 may require that each control parameter stored for the child product is satisfied, that a minimum number of control parameters are satisfied, or that a sum of the weights assigned to control parameters that are satisfied exceeds a minimum value.

If, at step 708, the payment processing platform determines that the control parameters of the child transaction satisfy the control parameters stored in the first database DB1, then the method 700 proceeds to step 712.

At step 712, the payment processing platform determines whether the child transaction has split tender parameters present. If, at step 712, the payment processing platform determines that the child transaction has split tender parameters present, the method 700 proceeds to step 730, described below.

However, if the payment processing platform determines that the child transaction does not have split tender parameters present, then the method 700 proceeds to step 714, where the payment processing platform determines whether the child transaction is associated with rules parameters and, if so, whether the rules parameters are satisfied. As previously described, the rules parameters cause particular types of transactions to withdraw funds for that transaction from one or more particular accounts. For example, a user can specify that when a grocery store purchase is made, only banking accounts (e.g., savings and checking accounts) should be used to pay for the purchase, thereby foregoing charging the amounts to a credit card. If, at step 714, the payment processing platform determines that the rules parameters are satisfied, then the method 700 proceeds to step 716, described below. However, if the rules parameters are not satisfied, then, at step 715, the payment processing platform chooses one or more accounts indicated by the rules parameters, whereupon step 716 is performed.

At step 730, the child transaction is configured with split tender parameters, and the payment processing platform passes the split tender parameters to generate two or more core account transactions for each of the core accounts linked to the child product. In one example, the split tender parameters link the child product to three separate and distinct core accounts, where each of the core accounts is configured to provide a percentage of the total funds required by the child transaction. For example, 50% is to be drawn from the first linked core account, 25% is to be drawn from the second linked core account, and 25% is to be drawn from the third linked core account. If the child transaction is for the amount of $100.00, then the first core account transaction is configured to withdraw $50.00 from the first linked core account, the second core account transaction is configured to withdraw $25.00 from the second linked core account, and the third core account transaction is configured to withdraw $25.00 from the third linked core account.

At step 731, the first of the three core account transactions is selected. Next, similar to step 714 described above, the payment processing platform, at step 732, determines whether the child transaction is associated with rules parameters and, if so, whether the rules parameters are satisfied. If the rules parameters are not satisfied, then the payment processing platform, at step 733, chooses one or more accounts indicated by the rules parameters.

At step 734, the selected core account transaction is transmitted to the respective financial institution that determines if sufficient funds are present to authorize or decline the core account transaction. If, at step 734, the respective financial institution determines that the core account transaction is authorized, then the method 700 proceeds to step 736.

At step 736, the payment processing platform determines whether there are additional core account transactions. If, at step 736, the payment processing platform determines that there are additional core account transactions, the method 700 proceeds to step 738. At step 738, the next core account transaction is selected and step 734 is repeated for the selected core account transaction. The method 700 then returns to step 734, described above.

Referring back to step 736, if the payment processing platform determines that there are no additional core account transactions, then the transaction has successfully completed, a notification is transmitted to the entity from which the child account transaction originated, and the method 700 ends.

Referring back to step 734, if the respective financial institution determines not to authorize the core account transaction, then the method proceeds to step 760.

At step 760, a core account transaction has been declined, and the payment processing platform determines the spillover amount required for withdrawal. In an example, a core account transaction for $100.00 is declined by the respective financial institution. The total spillover amount required for withdrawal would be $100.00.

At step 762, the payment processing platform determines whether the total amount of funds available in all configured spillover core accounts is greater than the spillover amount required. For example, if the child product is configured with three spillover core accounts, each with $500.00 available, the total amount of funds available is $1,500.00. Therefore, the total amount of funds available in all configured spillover core accounts (e.g., $1,500.00) is greater than the total spillover amount required (e.g., $100.00), and the method 700 proceeds to step 764. However, if the total amount of funds available in all configured spillover core accounts is $1,500.00 and the total spillover amount required is $2,000.00, there is no way that the total spillover amount would be able to fully fund the child transaction. If, at step 762, the payment processing platform determines that the total amount of funds available in all configured spillover core accounts is less than the spillover amount required, the method 700 proceeds to step 710, described above.

If, at step 762, the payment processing platform determines that the total amount of funds available in all configured spillover core accounts is greater than the spillover amount required, then the method 700 proceeds to step 764. At step 764, the first spillover account is selected. At step 766, a core account transaction is generated for the selected spillover core account for the total spillover amount required (e.g., $100.00). The transaction is then transmitted to the respective financial institution to be authorized or declined.

At step 768, the spillover amount is reduced by the amount that is successfully drawn from the selected spillover core account at step 766. Continuing with the above example, the total spillover amount required has been reduced to $0.00 since the original total spillover amount required was entirely funded by the first spillover core account transaction.

At step 772, the payment processing platform determines whether the total spillover amount is equal to $0.00 (i.e., child transaction amount has been fully funded). If, at step 772, the payment processing platform determines that the total spillover amount is not equal to $0.00, the method 700 proceeds to step 770.

At step 770, the payment processing platform iterates to the next spillover core account in the one or more spillover core accounts identified in step 762. The method 700 then returns to step 766, described above.

Referring back to step 772, if the payment processing platform determines that the total spillover amount is equal to $0.00, then the method 700 proceeds to step 774.

At step 774, the payment processing platform determines whether the spillover was required by a child product configured with split tender parameters. If the payment processing platform determines that the spillover was required by a child product configured with split tender parameters, the method 700 returns to step 736, described above. If the payment processing platform determines that the spillover was required by a child product that is not configured with split tender parameters, then the transaction has successfully completed, a notification is transmitted to the entity from which the child account transaction originated, and the method 700 ends.

At step 716, the child product is associated with only one core account, and a core account transaction is generated based on the core account number and other child transaction details. In one embodiment, the core account transaction is transmitted to the network for normal processing. For example, the financial institution that receives the core account transaction may view the core account transaction with the payment processing platform as being the "merchant" from which the transaction was initiated. In another embodiment, the core account transaction is transmitted directly to the financial institution from the payment processing platform, bypassing the network.

At step 716, the financial institution receives the core account transaction and determines whether there are sufficient funds in the core account and other rules such as card is valid, not lost, no fraud detected, etc. to complete the core account transaction. If, at step 716, the financial institution authorizes the core account transaction, a notification is transmitted to the entity from which the child account transaction originated, and the method 700 ends.

Referring back to step 716, if the financial institution does not authorize the core account transaction, the method 700 proceeds to step 718.

At step 718, the payment processing platform determines whether the child transaction has spillover functionality enabled. If, at step 718, the payment processing platform determines that the child transaction has spillover functionality enabled, the method 700 proceeds to step 760, described above.

If, at step 718, the payment processing platform determines that the child transaction does not have spillover functionality enabled, the method 700 proceeds to step 710, described above.

In addition, the payment processing platform is further configured to process refunds. Specifically, when the payment processing platform receives a refund request, the payment processing platform identifies a transaction to which the refund request responds, i.e., the transaction that caused funds to be withdrawn from one or more core accounts. Accordingly, the payment processing platform references the transaction to determine an appropriate amount of funds to be refunded into the one or more core accounts.

Figure 8:
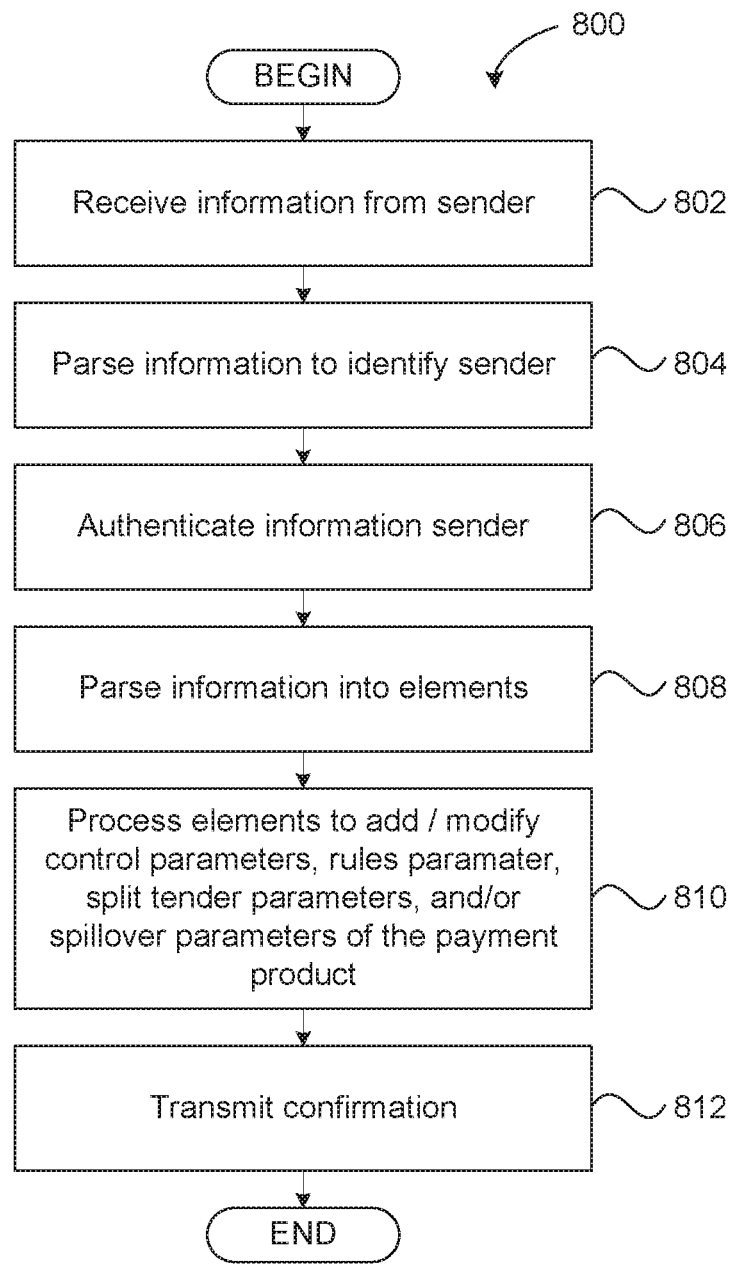
FIG. 8 is flow diagram of method steps for setting up or modifying the control parameters of a child product, according to one embodiment of the invention.

FIG. 8 is flow diagram of method steps for setting up or modifying the control parameters, rules parameters, split tender parameters, and spillover parameters of a child product through a user transmitting information via SMS message, email message, or IVR (interactive voice recognition), according to one embodiment of the invention. Persons skilled in the art will understand that, even though the method 800 is described in conjunction with the systems of FIGS. 1-2 and 4-6, any system configured to perform the steps of the method 800 illustrated in FIG. 8, in any order, is within the scope of the present invention.

As shown, the method 800 begins at step 802, where the payment processing platform 110 receives a message from a user. The message can include instructions for modifying the control parameters, split tender parameters, rules parameters, or spillover parameters associated with the child product. In a particular embodiment, the message is delivered to the payment processing platform 110 via a standard SMS short code service.

At step 804, payment processing platform 110 parses the received information to identify the user. For example, if the message is an SMS message, the phone number of the user can be extracted from the header of the SMS message. In some embodiments, the user may change the SMS account management settings to require that a security code is included in the SMS message. In these embodiments, the user would be required to include a security code in the body of the SMS message to modify the control parameters. If this additional security requirement is active, then the payment processing platform 110 may extract the security code by parsing the body of the SMS message.

At step 806, the payment processing platform 110 authenticates the user. In an embodiment where the message is an SMS message, the payment processing platform 110 authenticates the user by checking the extracted phone number against a database of phone numbers of registered users. In further embodiments, if the user has changed the SMS account management settings to require a security code, then the security code is also checked against the security code stored in a database of registered users. If the user cannot be properly authenticated, then the control parameter modification request is denied and the method 820 terminates. In some embodiments, a denial message may be transmitted to the user. If at step 826 the user is properly authenticated, then the method proceeds to step 828.

At step 808, the payment processing platform 110 parses the body of the message to identify elements of an instruction to modify one or more control parameters associated with a child product. In a particular embodiment, the body of the message includes one or more elements, such as a PIN number, a child product number, an action command, a control parameter element, and/or a control parameter value. The child product number references a particular account that is to be modified by the action command, the control parameter element, and the control parameter value. Action commands may include, but are not limited to, modifying the control parameters of a child product, creating a child product, cancelling or deleting a child product, suspending a child product, resuming a child product, modifying the split tender parameters of a child product, modifying the spillover account parameters of a child product, or modifying rules parameters. Control parameter elements may include, but are not limited to, the control parameters described at step 304 in FIG. 3A, such as card limit, expiration date, activation date, country of use, and merchant of use, and the like.

For example, a user may possess an SMS-enabled cellular phone. The cellular phone has been assigned the phone number 555-555-5555 by a cellular phone service provider. The user creates a new SMS message on the SMS-enabled cellular phone and specifies the appropriate destination contact number of the payment processing platform 110, such as short code "12345." The user then inputs an instruction for control parameter modification into the body of the new SMS message with the following format:

<Security Code>, <Core Account Number or a Child Product Number>, <Action Command>, <Control Element>, <Control Value>

For example, the body of the SMS message may be "2839, 0000-1111-2222-3333, Add, Spillover, 111-222-3333", where "2839" is the security code, "0000-1111-2222-3333" is the account number to which the "Spillover" number "111-222-3333" is added. At step 810, the payment processing platform 110 processes elements included in the instruction to add or modify the control parameters, the split tender parameters, the rules parameters, and/or the spillover parameters of the payment product.

At step 812, the payment processing platform 110 transmits a confirmation to the user that the control parameters were successfully added to the child product. The confirmation may be in the form of an SMS reply message. The SMS reply message is addressed to the phone number that requested the spillover account addition via SMS message. Additionally, the SMS reply message may also be sent to one or more auxiliary phone numbers associated with the core account, e.g., a parent's or co-worker's mobile phone. The body of the SMS reply message may include the results of processing the request. In some embodiments, step 812 is optional. Although the example in FIG. 8 is described primarily with respect to an SMS message, any other technically feasible mechanism may be implemented to modify the control parameters, the spillover parameters, the rules parameters and/or the split tender parameters of the payment product, such as IVR, email message, or a web page.

The method steps 800 describe an embodiment in which control parameter set up or modifications are received via a single SMS message. In an alternative embodiment, a series of SMS messages may be communicated between the payment processing platform 110 and the user. For example, the user may route a first SMS message including an indication of the account number to be modified. In response, the payment processing platform 110 may transmit an SMS that includes a list of parameters that may be set up or modified, thereby enabling the user to more easily remember the set up or modification options that are available to him or her. This process may be divided into any number of steps involving single or multiple parameters being transferred in each SMS message.

Figure 9:
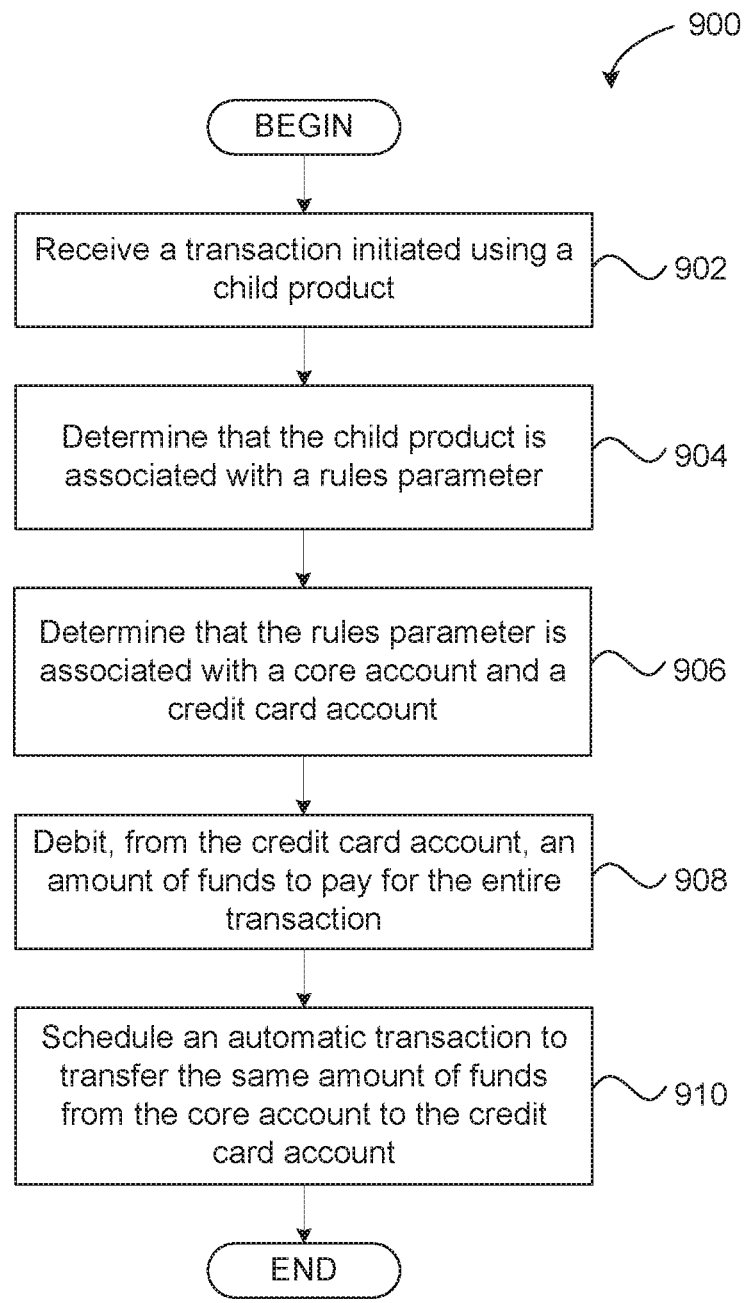
FIG. 9 is flow diagram of method steps for processing a transaction using rules parameters, a core account, and a credit card account, according to one embodiment of the invention.

FIG. 9 is flow diagram of method steps for processing a transaction using a rules parameter, a core account, and a credit card account, according to one embodiment of the invention. Persons skilled in the art will understand that, even though the method 900 is described in conjunction with the systems of FIGS. 1-2 and 4-6, any system configured to perform the steps of the method 900 illustrated in FIG. 9, in any order, is within the scope of the present invention.

Throughout the method 900, a rules parameter is configured to, for all transactions initiated using a child product, withdraw, from a credit card account that is associated with the rules parameter, an amount of funds to pay for the entire transaction. Subsequently, the same amount of funds is transferred from a core account to the credit card account.

As shown, the method 900 begins at step 902, where the payment processing platform receives a transaction initiated using a child product. At step 904, the payment processing platform determines that the child product is associated with a rules parameter. At step 906, the payment processing platform determines that the rules parameter is associated with a core account (e.g., a checking account or a prepaid account) and a credit card account, and is configured to behave according to the technique described above.

At step 908, an amount of funds to pay for the entire transaction is debited from the credit card account. At step 910, the payment processing platform schedules an automatic transaction to transfer the same amount of funds from the core account to the credit card account. In one embodiment, the automatic transaction is scheduled to perform the transfer at a relevant time, e.g., immediately prior to midnight of the day on which the funds from the credit card are withdrawn. In such an embodiment, the payment processing platform may be configured to, when additional transactions are initiated using the child product, schedule a single automatic transaction to transfer the total amount of funds charged to the credit card account that day. In another embodiment, the transfer is scheduled to occur after the funds are debited from the credit card account. In yet another embodiment, the user selects the specific transaction to be paid through a user interface rather than automatically through rules parameters. For example, the user may log into his or her account via a user interface, whereupon he or she is presented with a complete list of transactions. Accordingly, the user selects one or more transactions to be paid either immediately or at a scheduled time.

In sum, embodiments of the invention provide enhanced techniques for child product transactions that are funded by multiple core accounts. A child product can be linked to multiple core accounts that are configured to provide a portion of the total price of each transaction that is generated by the child product. Alternatively, rules parameters may be used to pay for a specific type of transaction using a specific type of account. Alternatively, a specific transaction on one account is payable via a different account. Linking multiple core accounts to a child product allows individuals to maintain a more even distribution of funds across core accounts, eliminating the necessity of manually transferring funds between accounts. Linking multiple core accounts to a child product also allows individuals to carry a single card that can be used as different types of cards such as a debit card for grocery shopping and credit card for travel. Linking multiple core accounts to a child product can also reduce the frequency of overdraft fees and declined transactions. A child product can also be linked to one or more spillover accounts that provide emergency funds to the child product when transactions generated by the child product cannot be fully funded by core account that is linked to the child product. The spillover accounts are sequentially accessed in attempt to supply the funds that were unable to be withdrawn from the one or more core accounts that are linked to the child product. Linking one or more spillover accounts also reduces the frequency of overdraft fees and declined transactions.

While the forgoing is directed to embodiments of the present invention, other and further embodiments of the invention may be devised without departing from the basic scope thereof. For example, aspects of the present invention may be implemented in hardware or software or in a combination of hardware and software. In addition, one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A computer-implemented method for generating a financial product that is configured to be used for one or more payment transactions, the method comprising:
receiving, from a user device via a network, a selection of two or more core accounts for providing financial backing for the financial product;
generating, via one or more processors, the financial product based on one or more control parameters that define use restrictions for the financial product and based on one or more rules parameters that:
specify the or more core accounts from which funds to satisfy a payment amount are to be debited, and
specify a different relative percentage value for each of the two or more core accounts that indicates how much of given funds associated with a given payment transaction are to be debited from the core account,
wherein the financial product has a number that is different from selected account numbers of the two or more core accounts;
causing the financial product to be distributed to the user device via the network;
receiving a payment transaction involving the financial product;

verifying the one or more control parameters and associating the financial product to a selected account number of at least one core account of the two or more core accounts, wherein verifying the one or more control parameters comprises implementing the number of the financial product as a reference pointer to identify the one or more control parameters stored to a control parameter database; and applying the one or more rules parameters to debit the funds from the at least one core account of the two or more core accounts to satisfy the payment transaction, wherein the debiting of funds from the at least one core account is based on the relative percentage values of the two or more core accounts.

2. The method of claim 1, wherein each core account included in the two or more core accounts comprises one of: a checking account, a savings account, a home equity account, a money market account, a debit card account, a prepaid card account, a gift card account, a healthcare savings account, an educational savings account, a credit card account, an employee benefits account, a rewards account, a billing account, or a promotion fund account.

3. The method of claim 1, wherein each control parameter included in the one or more control parameters comprises one of: a spending limit, a per-transaction spending limit, a daily spending limit, a weekly spending limit, a limit on a number of payment transactions in a given period of time, a name on card, an activation date, an expiration date, a merchant of use, a merchant category, a time of day, a day of week, a date of month, a merchant channel, a geographical region of use, a Card Verification Value, or a PIN number.

4. The method of claim 1, wherein the number of the financial product is associated with a contactless payment option for enabling contactless payment transactions.

5. The method of claim 1, further comprising receiving a return transaction involving the financial product, wherein funds are credited to the two or more core accounts used to fund a corresponding the payment transaction.

6. The method of claim 1, wherein a first control parameter included in the one or more control parameters specifies a first payment transaction is to be below a total amount available on a first core account included in the two or more core accounts.

7. The method of claim 1, wherein the number of the financial product is used for one or more payment transactions.

8. One or more non-transitory computer-readable storage media storing instructions that, when executed by one or more processors, cause the one or more processors to generate a financial product that is configured to be used for one or more payment transactions, by performing the steps of:

receiving, from a user device via a network, a selection of two or more core accounts for providing financial backing for the financial product;

generating the financial product based on one or more control parameters that define use restrictions for the financial product and based on one or more rules parameters that:

specify the or more core accounts from which funds to satisfy a payment amount are to be debited, and specify a different relative percentage value for each of the two or more core accounts that indicates how much of given funds associated with a given payment transaction are to be debited from the core account, wherein the financial product has a number that is different from selected account numbers of the two or more core accounts;

causing the financial product to be distributed to the user device via the network;

receiving a payment transaction involving the financial product;

verifying the one or more control parameters and associating the financial product to a selected account number of at least one core account of the two or more core accounts, wherein verifying the one or more control parameters comprises implementing the number of the financial product as a reference pointer to identify the one or more control parameters stored to a control parameter database; and applying the one or more rules parameters to debit the funds from the at least one core account of the two or more core accounts to satisfy the payment transaction, wherein the debiting of funds from the at least one core account is based on the relative percentage values of the two or more core accounts.

9. The one or more non-transitory computer-readable storage media of claim 8, wherein each core account included in the two or more core accounts comprises one of: a checking account, a savings account, a home equity account, a money market account, a debit card account, a prepaid card account, a gift card account, a healthcare savings account, an educational savings account, a credit card account, an employee benefits account, a rewards account, a billing account, or a promotion fund account.

10. The one or more non-transitory computer-readable storage media of claim 8, wherein each control parameter included in the one or more control parameters comprises one of: a spending limit, a per-transaction spending limit, a daily spending limit, a weekly spending limit, a limit on a number of payment transactions in a given period of time, a name on card, an activation date, an expiration date, a merchant of use, a merchant category, a time of day, a day of week, a date of month, a merchant channel, a geographical region of use, a Card Verification Value, or a PIN number.

11. The one or more non-transitory computer-readable storage media of claim 8, wherein the number of the financial product is associated with a contactless payment option for enabling contactless payment transactions.

12. The one or more non-transitory computer-readable storage media of claim 8, further comprising receiving a return transaction involving the financial product, wherein funds are credited to the two or more core accounts used to fund the payment transaction.

13. The one or more non-transitory computer-readable storage media of claim 8, further comprising:

receiving, via the network, a device profile from a user device; and authenticating the user device by comparing the device profile with data stored on an authentication server.

14. The one or more non-transitory computer-readable storage media of claim 13, wherein the authentication server comprises a device fingerprint authentication server.

15. The one or more non-transitory computer-readable storage media of claim 8, further comprising performing an authentication process for authenticating the at least one core account.

16. A computer system, comprising:

a processor; and a memory storing instructions that, when executed by the processor, cause the computer system to generate a financial product that is configured to be used for one or more payment transactions, by performing the steps of:

receiving, from a user device via a network, a selection of two or more core accounts for providing financial backing for the financial product;

generating the financial product based on one or more control parameters that define use restrictions for the financial product and based on one or more rules parameters that:

specify the or more core accounts from which funds to satisfy a payment amount are to be debited, and specify a different relative percentage value for each of the two or more core accounts that indicates how much of given funds associated with a given payment transaction are to be debited from the core account, wherein the financial product has a number that is different from selected account numbers of the two or more core accounts;

causing the financial product to be distributed to the user device via the network;

receiving a payment transaction involving the financial product;

verifying the one or more control parameters and associating the financial product to a selected account number of at least one core account of the two or more core accounts, wherein verifying the one or more control parameters comprises implementing the number of the financial product as a reference pointer to identify the one or more control parameters stored to a control parameter database; and applying the one or more rules parameters to debit the funds from the at least one core account of the two or more core accounts to satisfy the payment transaction, wherein the debiting of funds from the at least one core account is based on the relative percentage values of the two or more core accounts.

17. The computer system of claim 16, wherein each core account included in the two or more core accounts comprises one of: a checking account, a savings account, a home equity account, a money market account, a debit card account, a prepaid card account, a gift card account, a healthcare savings account, an educational savings account, a credit card account, an employee benefits account, a rewards account, a billing account, or a promotion fund account.

18. The computer system of claim 16, wherein the user device comprises a desktop computer, a laptop computer, a mobile device, a mobile phone, a personal digital assistant, standard telephone, or an ATM terminal.

* * * * *

UNITED STATES PATENT AND TRADEMARK OFFICE
CERTIFICATE OF CORRECTION

PATENT NO.         : 10,740,843 B2
APPLICATION NO.    : 15/681298
DATED              : August 11, 2020
INVENTOR(S)        : Rajesh G. Shakkarwar It is certified that error appears in the above-identified patent and that said Letters Patent is hereby corrected as shown below:

In the Claims

Column 21, Claim 5, Line 39, please delete "a corresponding".

Signed and Sealed this
Twenty-seventh Day of October, 2020

Andrei Iancu
*Director of the United States Patent and Trademark Office*